United States Patent
Xiao et al.

(10) Patent No.: US 9,467,339 B2
(45) Date of Patent: Oct. 11, 2016

(54) TESTING TOLL-FREE DATA SERVICE CAMPAIGNS

(71) Applicant: Verizon Patent and Licensing Inc., Arlington, VA (US)

(72) Inventors: Hong Xiao, Acton, MA (US); Fenglin Yin, Lexington, MA (US); Ajit Nair, Newton, MA (US); Susan Kelly, Maynard, MA (US); Fengping Zhang, Burlington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 77 days.

(21) Appl. No.: 14/463,035

(22) Filed: Aug. 19, 2014

(65) Prior Publication Data

US 2016/0057013 A1 Feb. 25, 2016

(51) Int. Cl.
*H04L 12/24* (2006.01)
*H04M 3/24* (2006.01)
*H04L 12/14* (2006.01)

(52) U.S. Cl.
CPC ............ *H04L 41/0866* (2013.01); *H04L 12/14* (2013.01); *H04L 12/1496* (2013.01); *H04L 41/5038* (2013.01); *H04M 3/248* (2013.01); *H04L 12/1435* (2013.01); *H04L 41/0873* (2013.01)

(58) Field of Classification Search
CPC ............... H04L 41/0866; H04L 12/14; H04L 41/5038; H04L 41/0873; H04L 12/1496; H04L 12/1435; H04M 3/248
See application file for complete search history.

(56) References Cited

U.S. PATENT DOCUMENTS

| | | | | |
|---|---|---|---|---|
| 8,725,561 B1* | 5/2014 | Chatterjee | .......... | G06Q 30/0242 705/14.1 |
| 2002/0176378 A1* | 11/2002 | Hamilton | ............ | H04L 12/2602 370/328 |
| 2010/0198698 A1* | 8/2010 | Raleigh | .............. | G06Q 30/0601 705/26.1 |
| 2012/0122461 A1* | 5/2012 | Hossain | .............. | H04W 72/085 455/450 |
| 2012/0155380 A1* | 6/2012 | Hodges | .................. | G06Q 30/00 370/328 |
| 2012/0278229 A1* | 11/2012 | Vishwanathan | ..... | G06Q 20/123 705/40 |
| 2013/0318173 A1* | 11/2013 | Kaplinger | ............. | H04L 61/301 709/206 |

* cited by examiner

*Primary Examiner* — Jianye Wu

(57) ABSTRACT

A device may receive information that identifies a toll-free data service campaign to be tested. The device may receive information that identifies a network to be used to test the toll-free data service campaign. The device may deploy the toll-free data service campaign on the network by deploying a campaign rule, associated with the toll-free data service campaign, that identifies a condition for charging a content provider, associated with the toll-free data service campaign, for data used by a mobile device in association with the toll-free data service campaign. The device may determine a testing criteria for testing the toll-free data service campaign on the network. The device may test the toll-free data service campaign on the network using the testing criteria. The device may determine a test result based on testing the toll-free data service campaign, and may provide information that identifies the test result.

20 Claims, 18 Drawing Sheets

TESTING TOLL-FREE DATA SERVICE CAMPAIGNS

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that provides the toll-free data service, rather than to an end user that uses the toll-free data service.

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a service provider (e.g., a content provider) that provides the toll-free data service, rather than to an end user that uses a mobile device to access the toll-free data service. Unlike toll-free telephone numbers that may take days to deploy, toll-free data services may be deployed in near real-time. For example, a content provider may set up a toll-free data service campaign that describes parameters of a toll-free data service, and a network operator may use the parameters to deploy the toll-free data service campaign. However, managing testing and deployment of toll-free data services efficiently and effectively may be difficult. Implementations described herein describe architectures and operations for efficient, effective, and structured testing and deployment of toll-free data service campaigns in a manner that reduces negative impacts to networks via which the toll-free data service campaigns are deployed.

Figure 1:
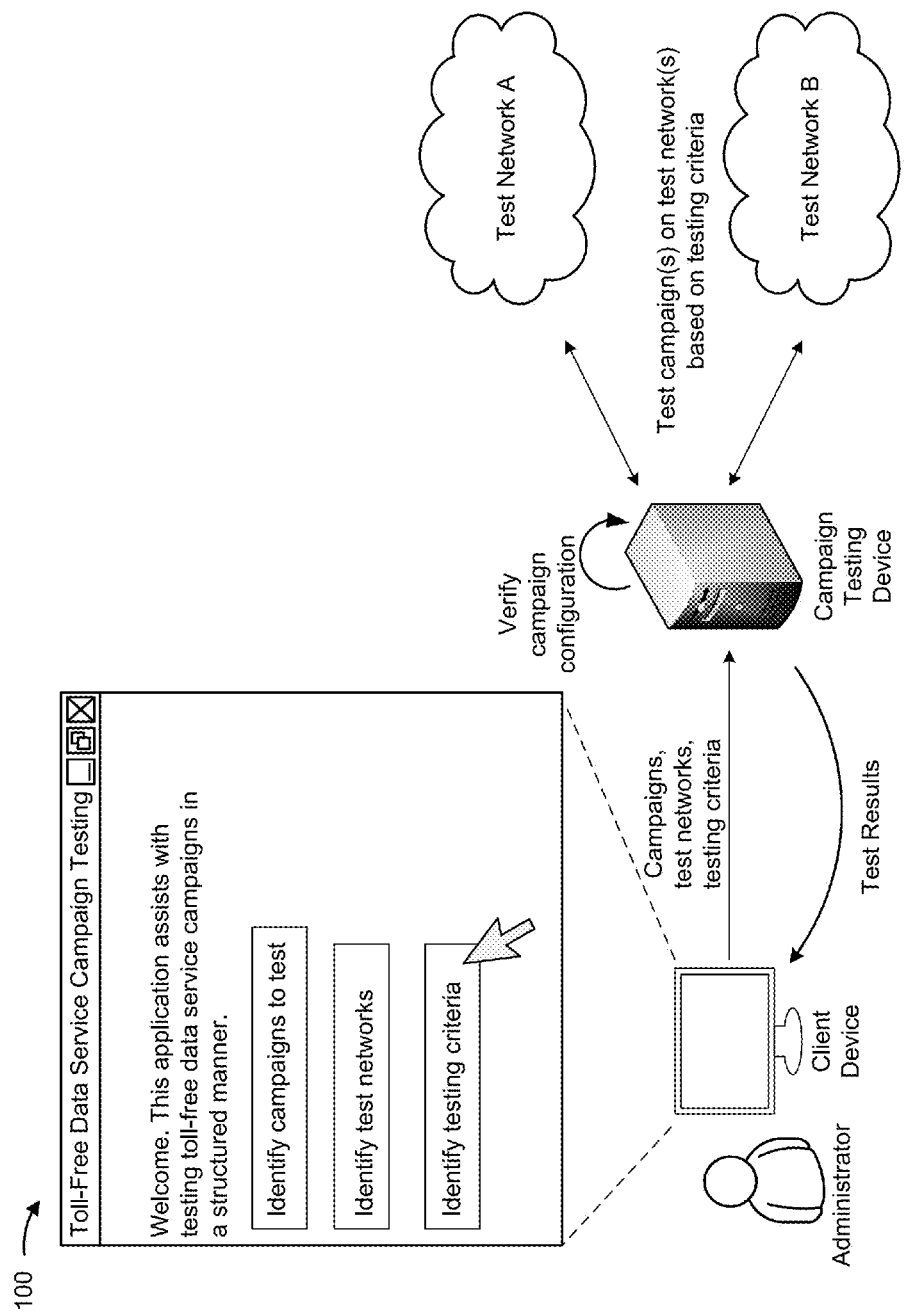
FIG. 1 is a diagram of an overview of an example implementation described herein.

FIG. 1 is a diagram of an overview of an example implementation 100 described herein. As shown in FIG. 1, an administrator may interact with a client device (e.g., a desktop computer, a laptop computer, etc.) to interact with an application that assists in testing and deploying toll-free data service campaigns ("campaigns") in a structured manner. For example, the administrator may provide input, to the client device, to identify campaigns to test, to identify networks on which to test the campaigns, and to identify testing criteria for testing the campaigns on the networks.

As further shown in FIG. 1, the client device may provide information associated with the identified campaigns, the identified test networks, and the identified testing criteria to a campaign testing device (e.g., a server device, a security device, etc.). The campaign testing device may generate and/or verify a campaign configuration that includes configuration information for testing and/or deploying the identified campaigns on the identified test networks. As further shown, the campaign testing device may test the campaigns on the test networks (shown as "Test Network A" and "Test Network B") based on the testing criteria. The campaign testing device may provide test results to the client device, so that the administrator may view the test results. The campaign testing device may proceed with testing the campaigns on multiple test networks before deploying the campaign on a production network. In this way, disruptions to the production network may be reduced by systematically testing toll-free data service campaigns on test networks before deploying the toll-free data service campaigns on a production network.

Figure 2:
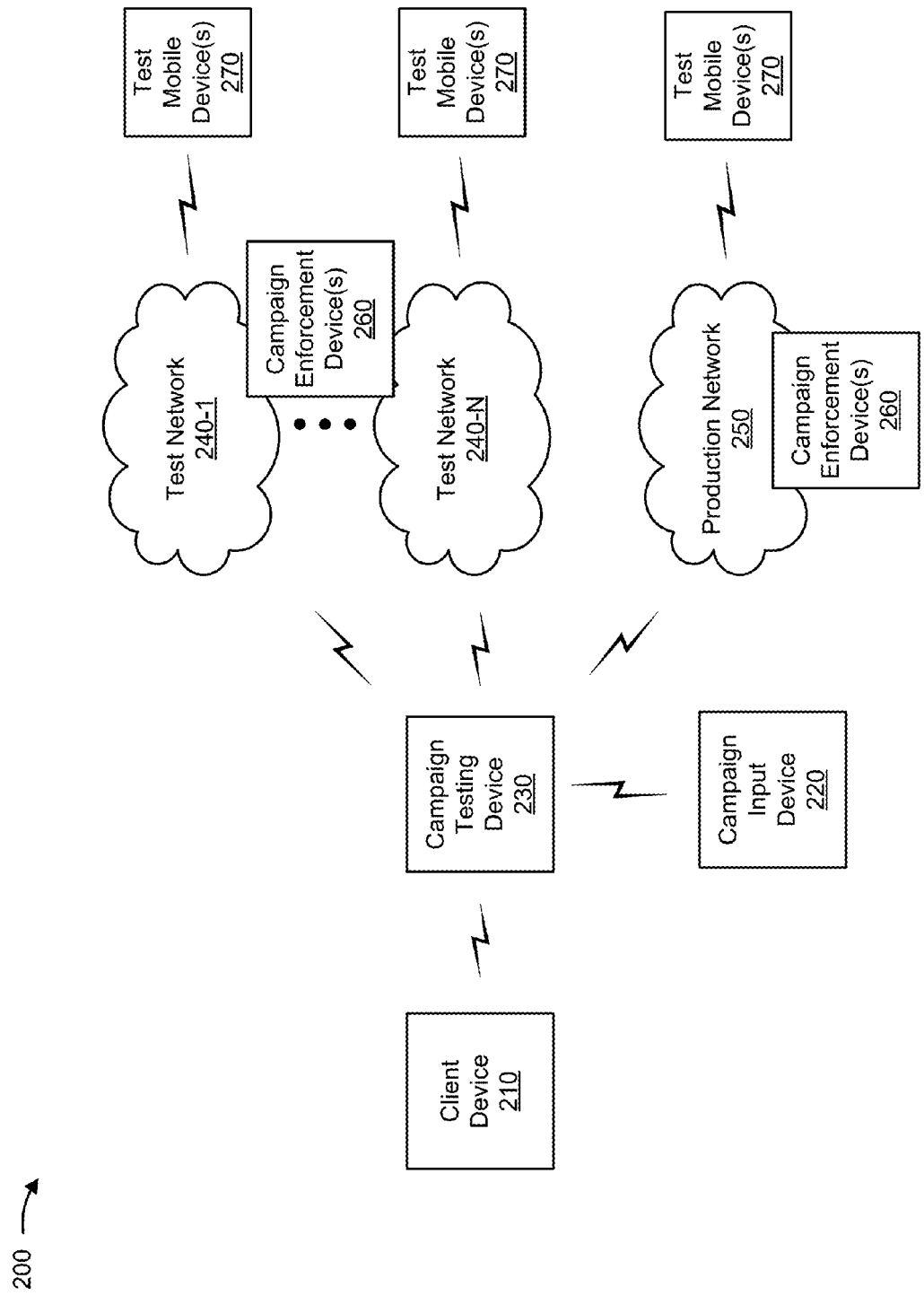
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a campaign input device 220, a campaign testing device 230, a set of test networks 240-1 through 240-N (N≥1) (hereinafter referred to collectively as "test networks 240," and individually as "test network 240"), a production network 250, a campaign enforcement device 260, and a test mobile device 270. Devices of environment 200 may interconnect via wired connections, wireless connections, or a combination of wired and wireless connections.

Client device 210 may include one or more devices capable of receiving, generating, storing, processing, and/or providing testing information associated with testing one or more toll-free data service campaigns (e.g., information associated with campaigns to be tested, information associated with test networks, information associated with testing criteria, configuration information, deployment information, test results, etc.). For example, client device 210 may include a computing device, such as a desktop computer, a laptop computer, a mobile phone, a server device, or a similar type of device. Client device 210 may receive input, from an administrator (e.g., a maintenance engineer), that identifies testing information relating to testing one or more toll-free data service campaigns, and may provide the testing information to another device, such as campaign testing device 230. Client device 210 may communicate with campaign testing device 230 to provide and/or receive information associated with testing the campaign(s).

Campaign input device 220 may include one or more devices capable of receiving, generating, storing, processing, and/or providing campaign information associated with a toll-free data service campaign. For example, campaign input device 220 may include a computing device, such as a desktop computer, a laptop computer, a mobile phone, a server device, or a similar type of device. Campaign input device 220 may receive input, from a content provider, that identifies campaign information, and may provide the campaign information to another device (e.g., client device 210, campaign testing device 230, etc.).

Campaign testing device 230 may include one or more devices capable of receiving, generating, storing, processing, and/or providing testing information associated with testing one or more toll-free data service campaigns. For example, campaign testing device 230 may include a computing device, such as a server device or a similar type of device. Campaign testing device 230 may receive testing information from client device 210, may process the testing information, and may use the testing information to test the campaign(s). For example, campaign testing device 230 may test the campaign(s) on one or more test networks 240 and/or one or more production networks 250. Campaign testing device 230 may assist in deploying the campaign(s) (e.g., to production network 250) after testing the campaign(s).

Test network 240 may include one or more wired and/or wireless networks, or a portion of one or more wired and/or wireless networks. For example, test network 240 may include a cellular network (e.g., a long term evolution (LTE) network, a third generation (3G) network, a second generation (2G) network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. In some implementations, campaign testing device 230 may test toll-free data service campaigns using test network 240 before the campaign is deployed on production network 250.

Production network 250 may include one or more wired and/or wireless networks. For example, test network 250 may include a cellular network (e.g., an LTE network, a 3G network, a 2G network, a CDMA network, etc.), a PLMN, a wireless local area network (e.g., a Wi-Fi network), a LAN, a WAN, a MAN, a telephone network (e.g., the PSTN), a private network, an ad hoc network, an intranet, the Internet, a fiber optic-based network, a cloud computing network, and/or a combination of these or other types of networks. In some implementations, campaign testing device 230 may test toll-free data service campaigns using test network 240 before the campaign is deployed on production network 250.

Campaign enforcement device 260 may include one or more devices capable of inspecting traffic and applying one or more campaign rules to the traffic. For example, campaign enforcement device 260 may include a gateway, a router, a modem, a switch, a firewall, a network interface card (NIC), a hub, a bridge, a server device, or a similar type of device. Campaign enforcement device 260 may receive campaign rules from campaign testing device 230, may apply the campaign rules to network traffic associated with test mobile device 270, and may handle the traffic and/or instruct other network devices (e.g., a packet data network gateway) how to handle the traffic based on the campaign rules. Additionally, or alternatively, campaign enforcement device 260 may instruct another network device (e.g., an accounting server) how to charge for data usage associated with the network traffic. Different campaign enforcement devices 260 may be associated with different networks and/or geographic regions, in some implementations.

Test mobile device 270 may include one or more devices capable of communicating with a network (e.g., test network 240, production network 250, etc.). For example, test mobile device 270 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar type of device. Test mobile device 270 may send traffic to and/or receive traffic from a network (e.g., via a base station, a radio access network access point, an air interface, etc.). In some implementations, test mobile device 270 may include a mobile device used by a network service provider for testing purposes, a mobile device of an employee of the network service provider, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
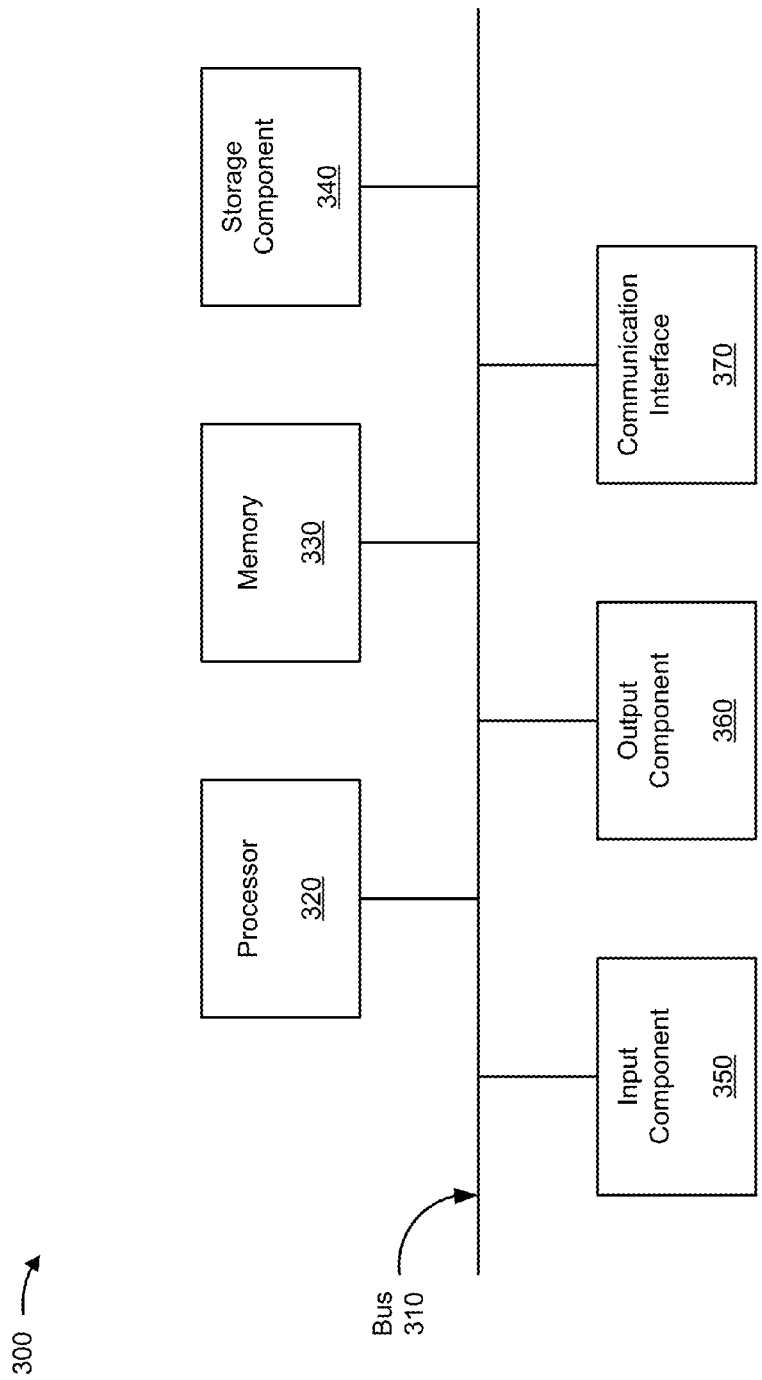
FIG. 3 is a diagram of example components of one or more devices of FIG. 2.

FIG. 3 is a diagram of example components of a device 300. Device 300 may correspond to client device 210, campaign input device 220, campaign testing device 230, campaign enforcement device 260, and/or test mobile device 270. In some implementations, client device 210, campaign input device 220, campaign testing device 230, campaign enforcement device 260, and/or test mobile device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
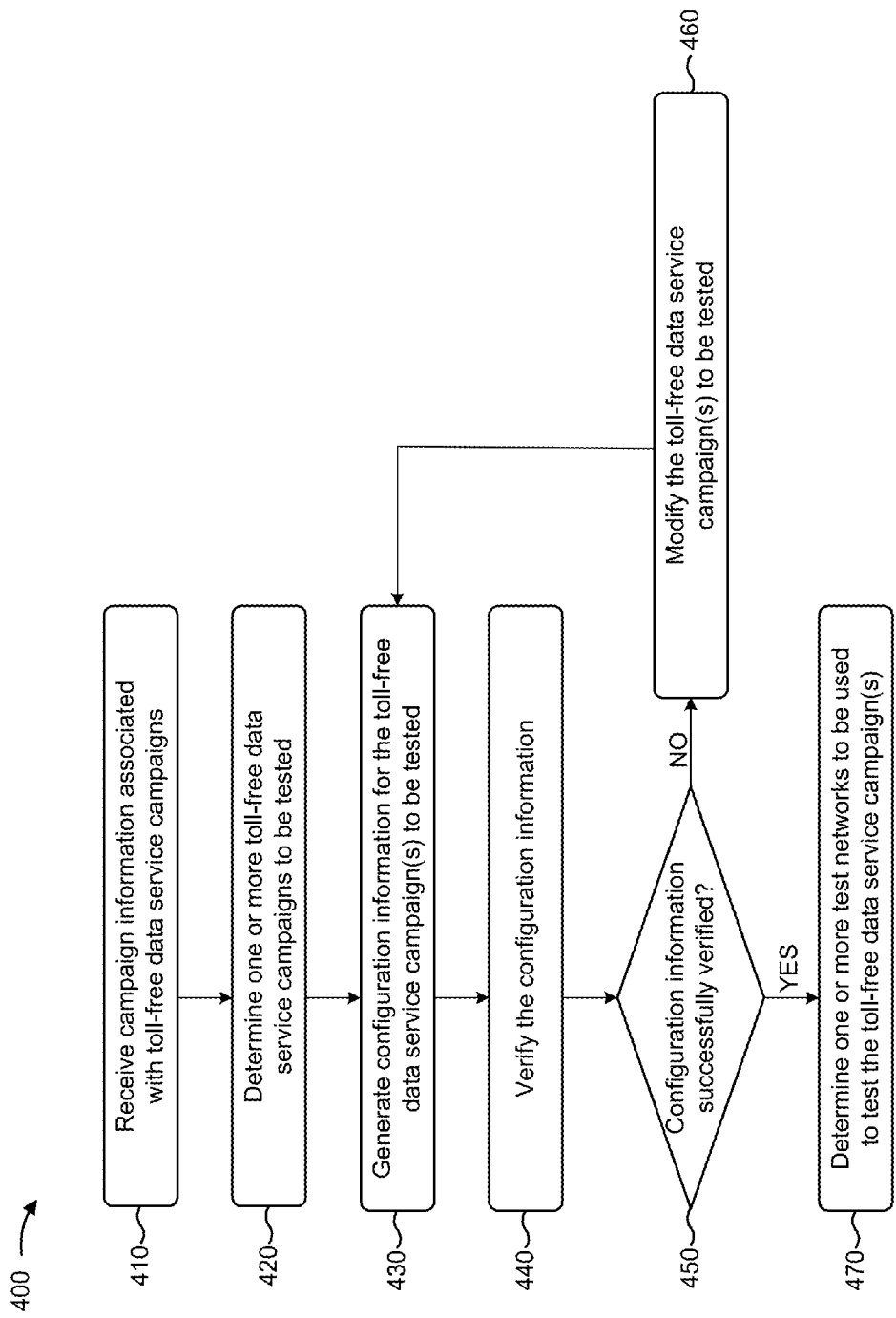
FIG. 4 is a flow chart of an example process for configuring testing of a toll-free data service campaign.

FIG. 4 is a flow chart of an example process 400 for configuring testing of a toll-free data service campaign. In some implementations, one or more process blocks of FIG. 4 may be performed by campaign testing device 230. Additionally, or alternatively, one or more process blocks of FIG. 4 may be performed by another device or a group of devices separate from or including campaign testing device 230, such as client device 210, campaign input device 220, campaign enforcement device 260, and/or test mobile device 270.

As shown in FIG. 4, process 400 may include receiving campaign information associated with toll-free data service campaigns (block 410). For example, campaign testing device 230 may receive campaign information associated with a set of toll-free data service campaigns. A toll-free data service campaign (sometimes referred to herein as a campaign) may refer to a campaign by a content provider where the content provider agrees to be charged for data usage by users of mobile devices (e.g., smart phones, tablets, etc.) that access content provided by the content provider (e.g., rather than the users being charged for the data usage).

Campaign information may include, for example, information that identifies a content provider associated with a campaign, information that identifies one or more content provider devices (e.g., server devices, etc.) that provide content associated with a campaign, information that identifies a geographic region associated with a campaign, information that identifies a time period during which a campaign is valid, information that identifies an amount of data (e.g., in bytes) that the content provider will pay for during the campaign (e.g., a maximum amount of data), information that identifies a uniform resource locator (URL) via which a toll-free data service can be accessed for the campaign, or the like.

In some implementations, an employee associated with the content provider may input campaign information using campaign input device 220, and campaign input device 220 may provide the campaign information to campaign testing device 230. Additionally, or alternatively, an administrator associated with a network that delivers a campaign may input campaign information using client device 210, and client device 210 may provide the campaign information to campaign testing device 230. The campaign information may be used to test and/or deploy the campaign (e.g., on test network 240, on production network 250, etc.).

As further shown in FIG. 4, process 400 may include determining one or more toll-free data service campaigns to be tested (block 420). For example, campaign testing device 230 may receive information that identifies a set of toll-free data service campaigns to be tested for deployment. In some implementations, an administrator may provide input to client device 210 to identify the set of campaigns to be tested, and client device 210 may provide information that identifies the set of campaigns (and/or campaign information associated with the set of campaigns) to campaign testing device 230.

As an example, client device 210 may receive information that identifies campaigns created by content providers (e.g., via campaign input device(s) 220). Client device 210 may provide such information for display (e.g., via a graphical user interface), and an administrator may provide input that identifies a set of campaigns to be tested (e.g., may select campaigns from a displayed list of campaigns). Additionally, or alternatively, the administrator may search for campaigns created by content providers to identify particular campaigns to be tested. Client device 210 may receive information that identifies campaigns, created by content providers, from campaign input device(s) 210, campaign testing device(s) 230, or another device.

As further shown in FIG. 4, process 400 may include generating configuration information for the toll-free data service campaign(s) to be tested (block 430). For example, campaign testing device 230 may generate configuration information to be used to test and/or deploy the campaigns on a network. The configuration information may include, for example, information that identifies the campaign(s) to be tested, campaign information associated with the campaign(s) to be tested (e.g., a time period during which a campaign is to be active, a geographic region where the campaign is to be deployed, etc.), a set of campaign rules associated with the campaign(s) to be tested, or the like. The set of campaign rules may specify a set of conditions for charging a content provider for data used by a mobile device to access a toll-free data service. In some implementations, campaign testing device 230 may combine the generated configuration information into a configuration file.

As further shown in FIG. 4, process 400 may include verifying the configuration information (block 440), and determining whether the configuration information was successfully verified (block 450). For example, campaign testing device 230 may verify the configuration information by running one or more tests on the configuration information (e.g., included in a configuration file). In some implementations, campaign testing device 230 may verify the configuration information by determining whether the configuration information was successfully generated (e.g., based on the campaign information, the campaign rules, etc.).

As an example, combining configuration information for multiple campaigns into a configuration file may generate an error (e.g., where the campaigns are incompatible). Campaign testing device 230 may test for such errors. Based on the executing one or more tests on the configuration information, campaign testing device 230 may determine whether the configuration information was successfully compiled and/or verified.

As further shown in FIG. 4, if the configuration information was not successfully verified (block 450—NO), then process 400 may include modifying the toll-free data service campaign(s) to be tested (block 460), and returning to block 430. For example, if campaign testing device 230 could not successfully verify the campaign information, then campaign testing device 230 may modify the set of campaigns to be tested. In some implementations, campaign testing device 230 may remove campaigns that could not be verified (e.g., that failed a test) from the set of campaigns to be tested. Campaign testing device 230 may generate updated configuration information for the modified set of campaigns, and may verify the updated configuration information.

Additionally, or alternatively, campaign testing device 230 may provide, to client device 210, information that identifies campaigns that could not be verified. An administrator may interact with client device 210 to modify the unverified campaigns (e.g., to modify campaign information and/or campaign rules, to debug compiled campaign information, to correct errors associated with a campaign, etc.) and/or to remove the unverified campaigns from the set of campaigns to be tested. Client device 210 may provide information associated with the modified campaigns (e.g., a different set of campaigns and/or modified information associated with the campaigns) to campaign testing device 230. Campaign testing device 230 may generate updated configuration information for the modified set of campaigns, and may verify the updated configuration information.

As further shown in FIG. 4, if the configuration information was successfully verified (block 450—YES), then process 400 may include determining one or more test networks to be used to test the toll-free data service campaign(s) (block 470). For example, if campaign testing device 230 successfully verifies the campaign information, then campaign testing device 230 may determine a set of test networks 240 to be used to test the campaign(s) associated with the verified campaign information.

In some implementations, campaign testing device 230 may receive information that identifies test network(s) 240. For example, an administrator may interact with client device 210 to identify a set of test networks 240 to be used to test the campaign(s). In some implementations, the administrator may identify one or more test network groups, that includes a set of test networks 240, and/or an order in which to test the campaign(s) using the test network groups.

For example, the administrator may create a first test network group that includes a smaller number of test networks 240, and may create a second test network group that includes a larger number of test networks 240. Additionally, or alternatively, the administrator may identify a set of production networks 250 to be used to test and/or deploy the campaign(s). Client device 210 may provide this information to campaign testing device 230, and campaign testing device 230 may use the information to test and/or deploy the campaign(s) (e.g., on the identified test networks 240 and/or production networks 250, in a particular identified order, etc.). For example, campaign testing device 230 may test the campaigns on a first test network 240, may then test the campaigns on a second test network 240, and may then test the campaigns on a production network 250. In this way, campaign testing device 230 may test the campaign(s) on a small scale before full deployment of the campaign(s).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5I are diagrams of an example implementation 500 relating to example process 400 shown in FIG. 4. FIGS. 5A-5I show an example of configuring testing of a toll-free data service campaign.

Figure 5A:
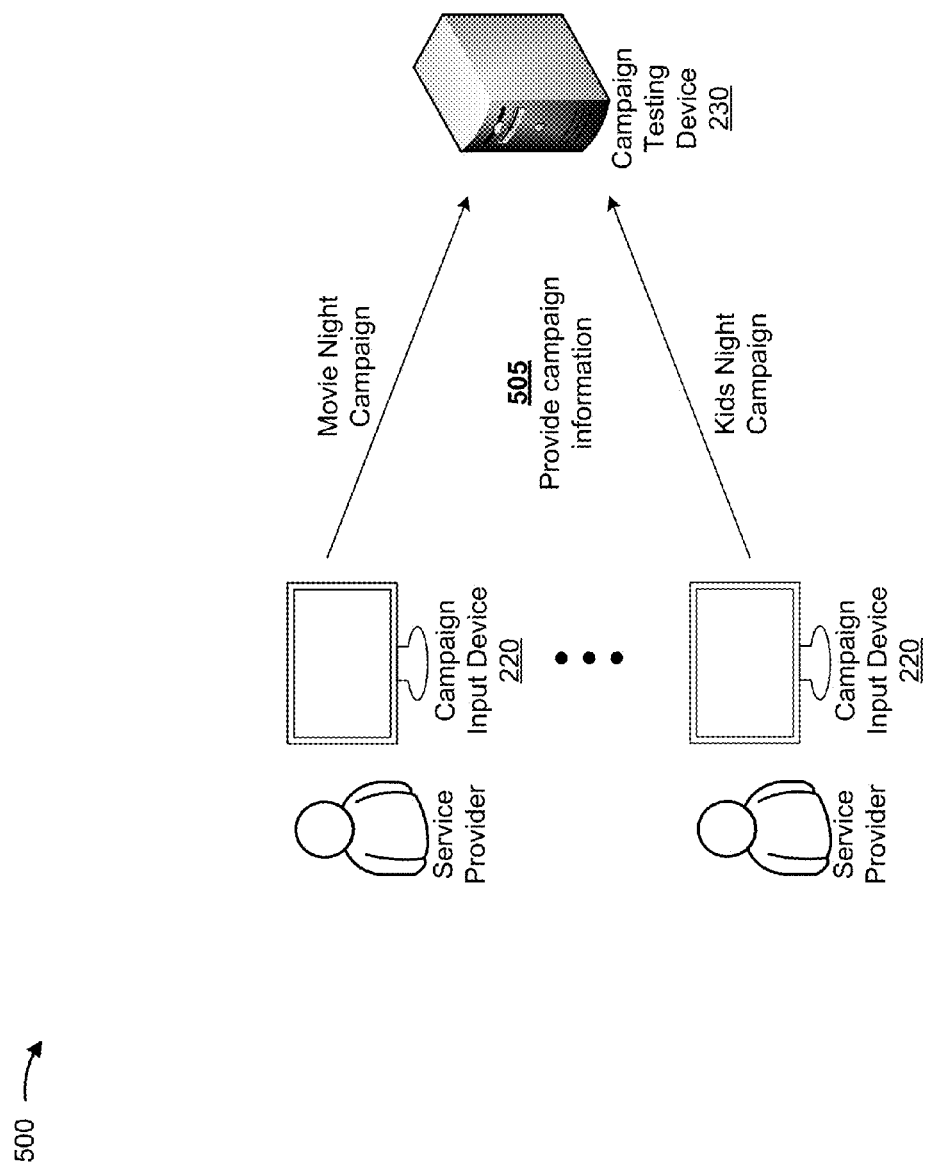
FIGS. 5A-5I are diagrams of an example implementation relating to the example process shown in FIG. 4.

As shown in FIG. 5A, and by reference number 505, assume that two different service providers interact with campaign input devices 220 to provide campaign information to campaign testing device 230. For example, assume that the first service provider inputs campaign information for a "Movie Night" toll-free data service campaign. Further, assume that the second service provider inputs campaign information for a "Kids Night" toll-free data service campaign. Further, assume that other service providers input campaign information for other campaigns using campaign input devices 220, and campaign input devices 220 provide the campaign information, relating to the other campaigns, to campaign testing device 230.

Figure 5B:
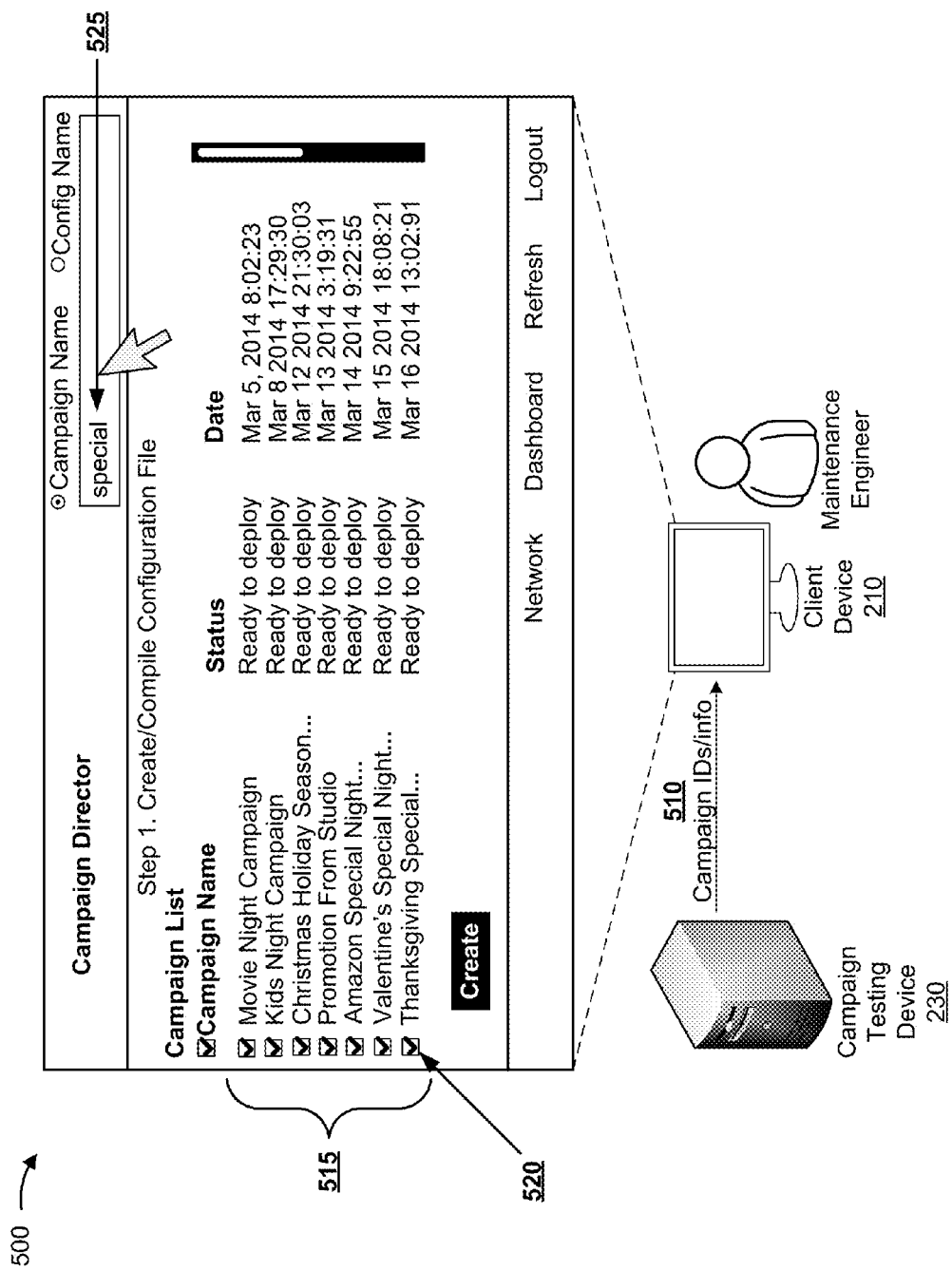

As shown in FIG. 5B, and by reference number 510, campaign testing device 230 provides campaign identifiers and campaign information, for the input campaigns, to client device 210. As shown by reference number 515, client device 210 provides the campaign identifiers for display (e.g., "Movie Night Campaign," "Kids Night Campaign," etc.). As further shown, client device 210 provides a status of each campaign (e.g., ready to deploy, deployed, being tested, on hold, error, needs additional campaign information, etc.), and a date and time at which each campaign was created.

As shown by reference number 520, an administrator, such as a maintenance engineer, may interact with client device 210 to select or deselect campaigns to be tested. For example, the maintenance engineer may check a box associated with a campaign to be tested, and may uncheck a box associated with a campaign that is not to be tested. Additionally, or alternatively, the maintenance engineer may search for campaigns (e.g., using a campaign name, using campaign information, using a name of a configuration that includes a campaign, etc.), as shown by reference number 525. For example, assume that the maintenance engineer searches for campaigns that include the word "special" in the name.

Figure 5C:
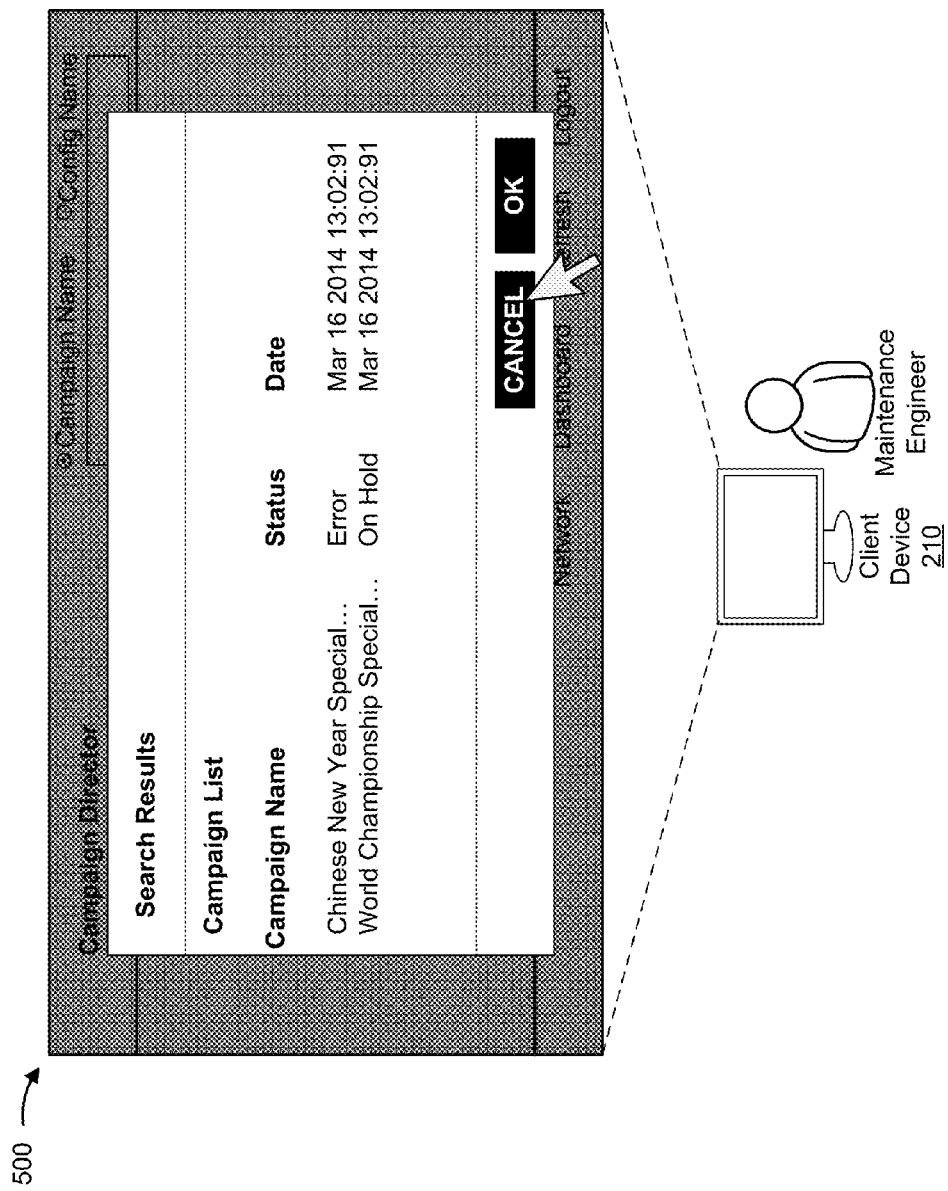

As shown in FIG. 5C, such user interaction may cause client device 210 to provide a list of campaigns with the word "special" in the name of the campaign, such as "Chinese New Year Special Campaign," "World Championship Special Campaign," or the like. The maintenance engineer may select one or more of these campaigns to be tested. In this case, assume that the maintenance engineer clicks "Cancel" to return to the previous user interface.

Figure 5D:
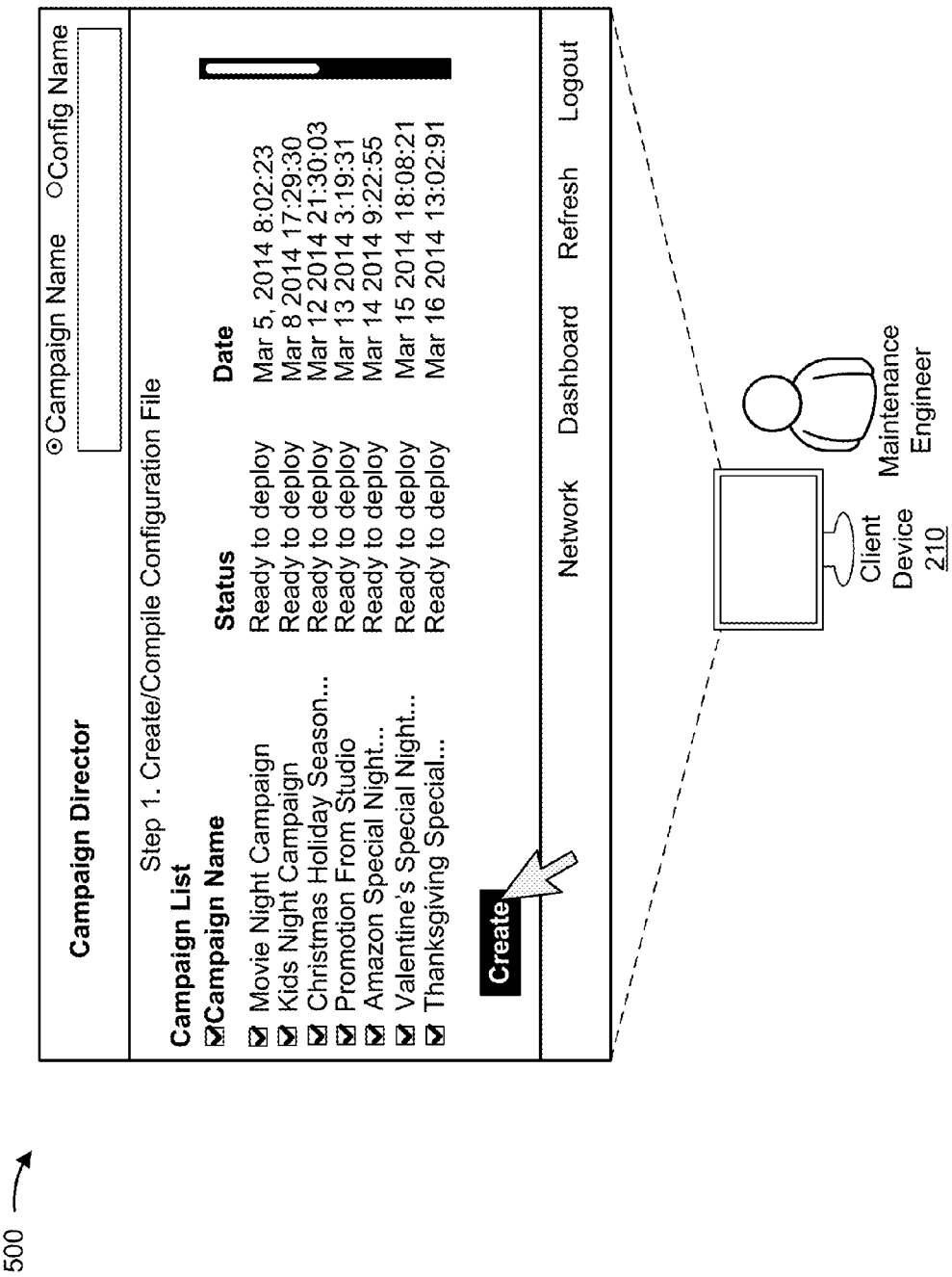

As shown in FIG. 5D, assume that the maintenance engineer selects all displayed campaigns. Further, assume that the maintenance engineer interacts with a "Create" button to instruct campaign testing device 230 to compile configuration information for the selected campaigns.

Figure 5E:
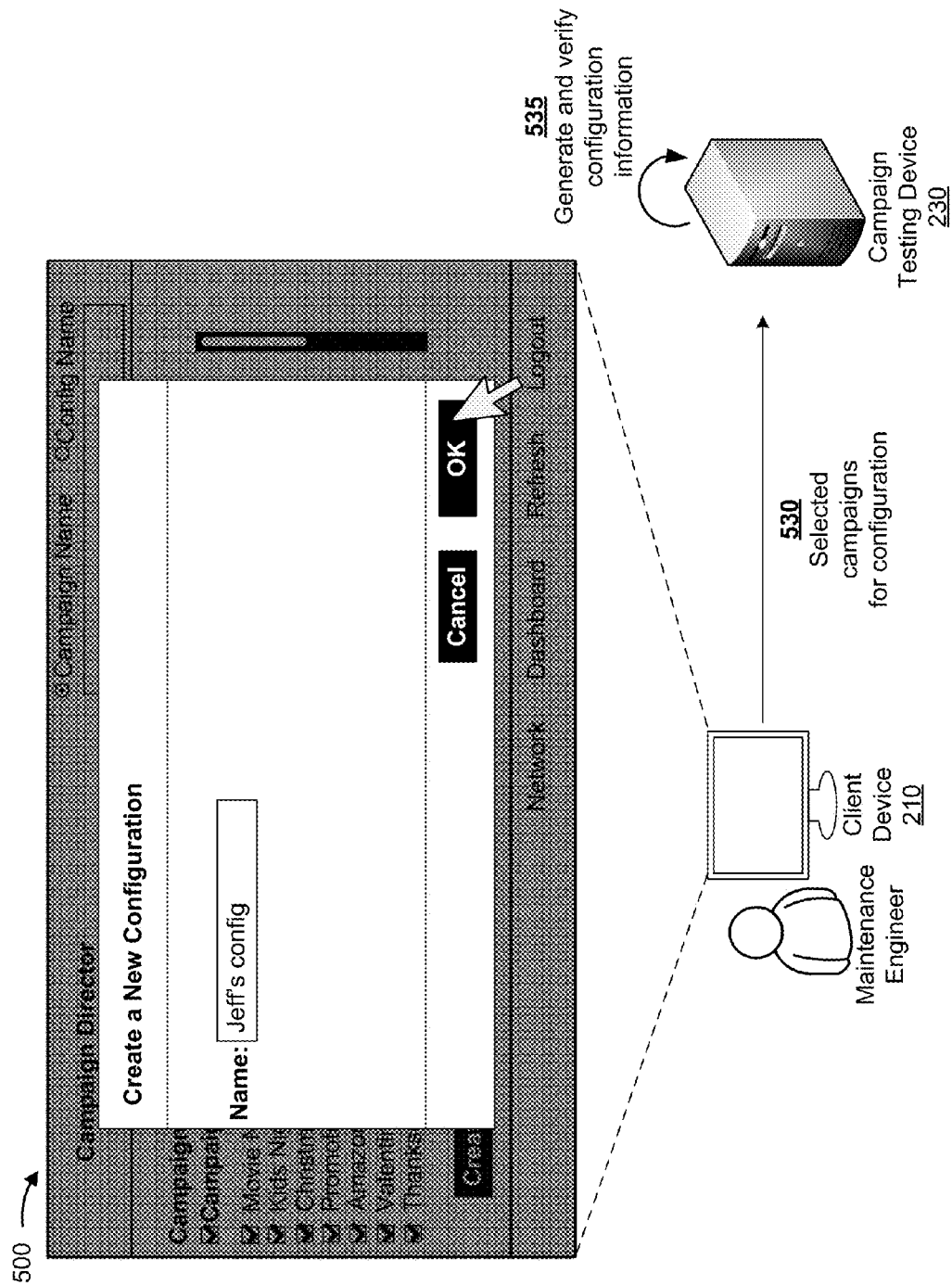

As shown in FIG. 5E, assume that the maintenance engineer inputs a name to identify a configuration associated with the selected campaigns. As shown, the maintenance engineer has input a configuration name of "Jeff's config."

The maintenance engineer may click the "Cancel" button to return to the user interface shown in FIG. 5D. For the purpose of FIG. 5E, assume that the user clicks an "OK" button, which causes client device 210 to provide information associated with the selected campaigns, to be configured and tested, to campaign testing device 230, as shown by reference number 530. As shown by reference number 535, assume that campaign testing device 230 generates and verifies configuration information for the selected campaigns. Additionally, or alternatively, client device 210 may generate the configuration information (e.g., based on input provided by the maintenance engineer, based on campaign information, etc.), and may provide the configuration information to campaign testing device 230 for verification.

Figure 5F:
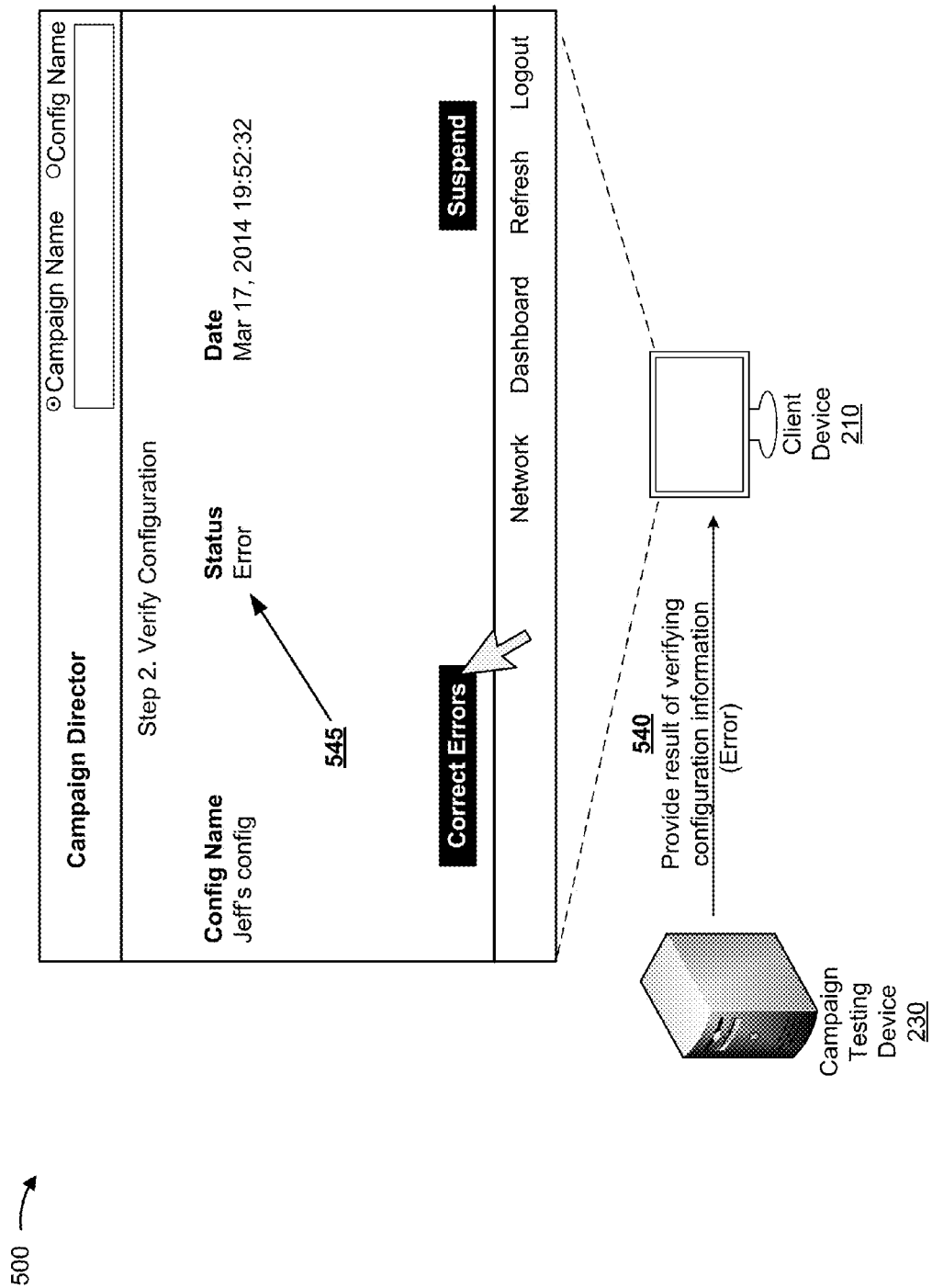

As shown in FIG. 5F, assume that campaign testing device 230 determines that there is an error with the configuration (e.g., a configuration file). As shown by reference number 540, campaign testing device 230 provides, to client device 210, a result of verifying the configuration information, which in this case is an error. As shown by reference number 545, client device 210 provides an indication of the error for display, along with an indication of the configuration information that generated the error (e.g., "Jeff's config"), and a date and time at which the error was generated (or a date and time at which the configuration information was generated). In some implementations, the maintenance engineer may click on the configuration name to display a user interface that lists the campaigns compiled in the configuration. Additionally, or alternatively, the maintenance engineer may interact with a "Suspend" button to return to a workflow step and the user interface shown in FIG. 5D. For the purpose of FIG. 5F, assume that the maintenance engineer interacts with a "Correct Errors" button to modify the set of campaigns to be tested.

Figure 5G:
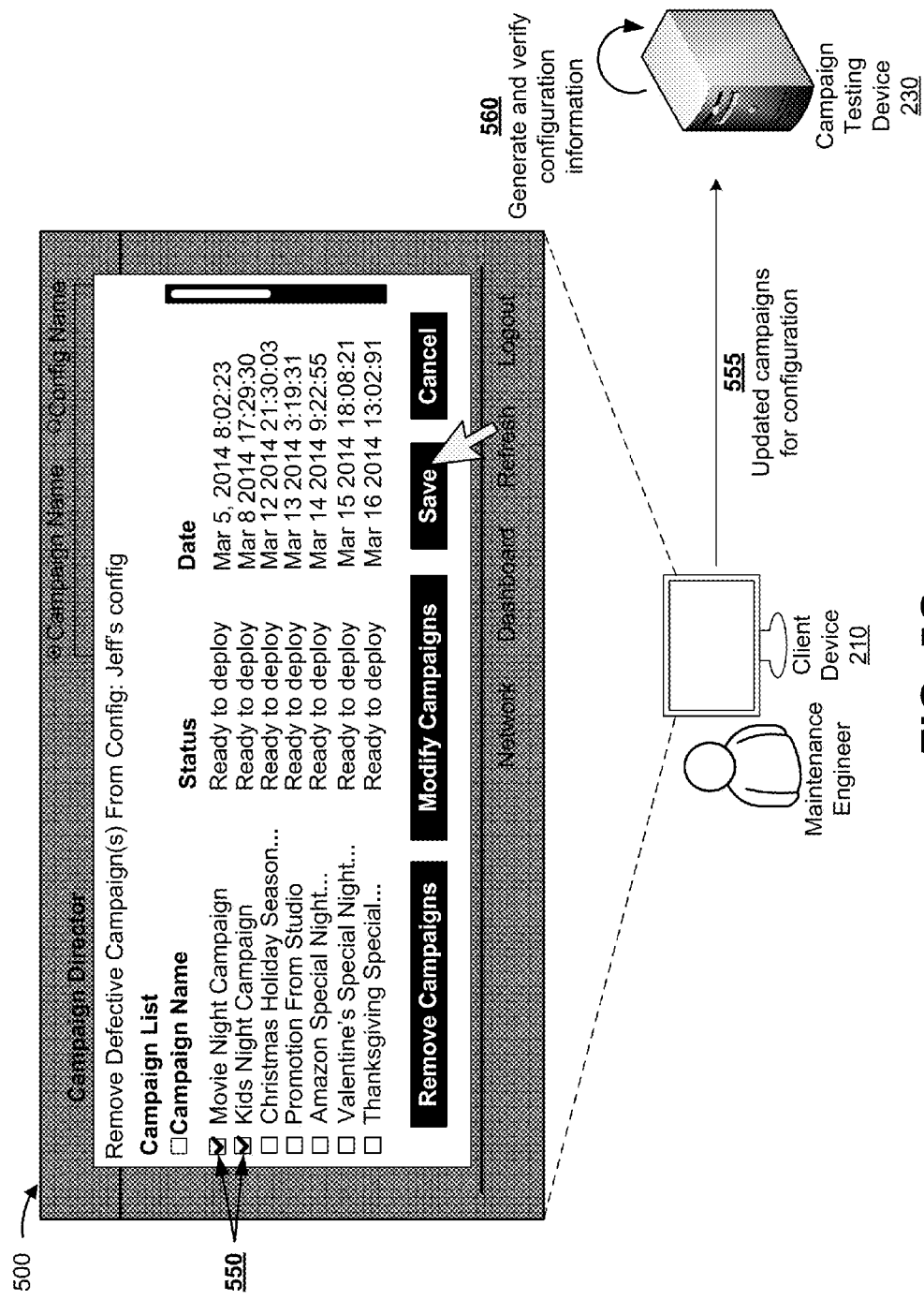

As shown in FIG. 5G, and by reference number 550, assume that the maintenance engineer deselects all campaigns except for the "Movie Night Campaign" and the "Kids Night Campaign." As further shown, assume that the maintenance engineer saves the new configuration, causing client device 210 to provide information associated with the updated campaigns to campaign testing device 230, as shown by reference number 555. As shown by reference number 560, assume that campaign testing device 230 generates and verifies configuration information for the updated campaigns.

Figure 5H:
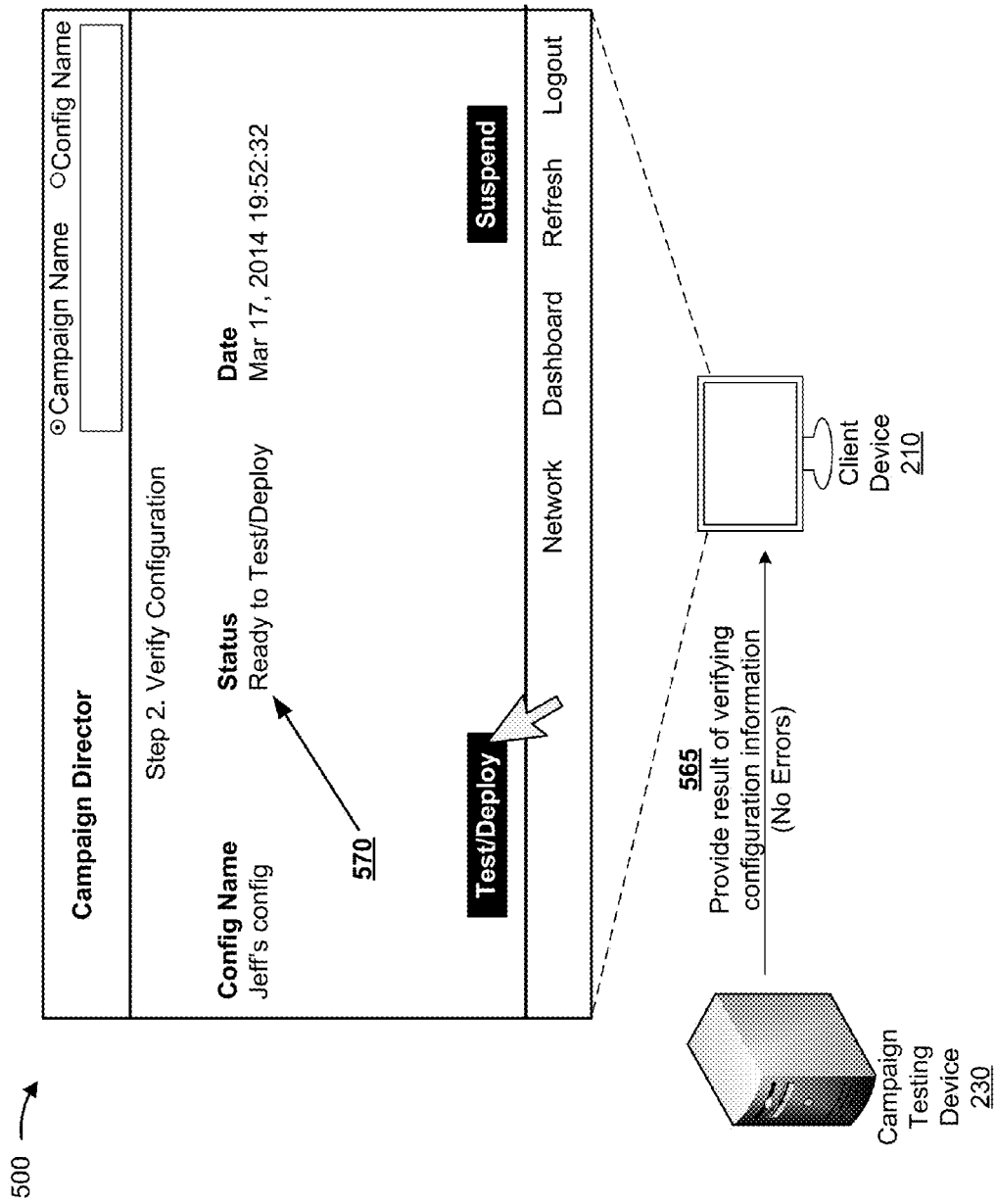

As shown in FIG. 5H, assume that campaign testing device 230 determines that the configuration was successfully verified (e.g., there were no errors associated with the configuration information). As shown by reference number 565, campaign testing device 230 provides, to client device 210, a result of verifying the configuration information, which in this case indicates that the configuration is error-free. As shown by reference number 570, client device 210 provides an indication that the campaigns included in the configuration are ready to be tested (e.g., are ready to be deployed to a test network 240). As further shown, assume that the maintenance engineer interacts with a "Test/Deploy" button to initiate testing of the campaigns.

Figure 5I:
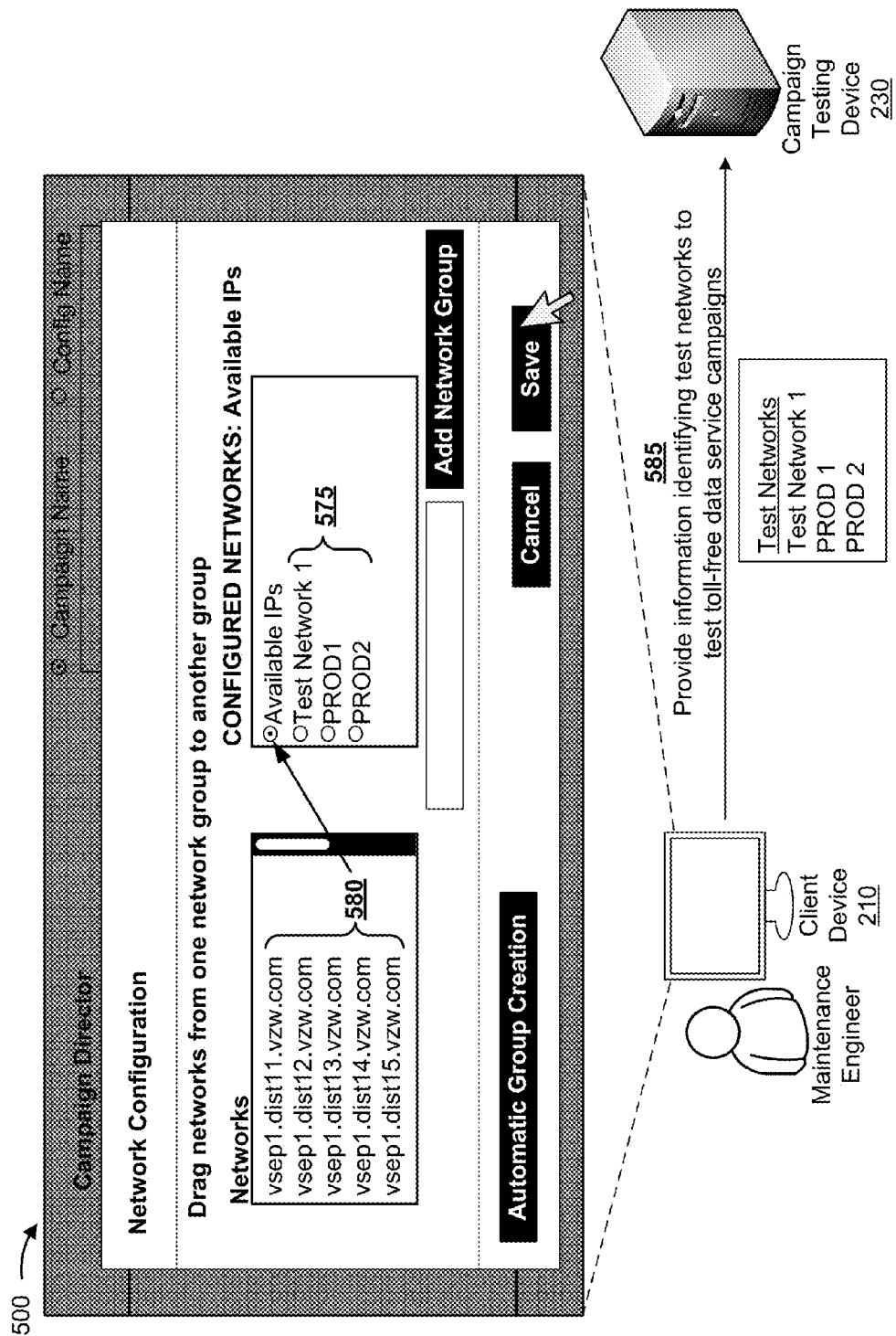

As shown in FIG. 5I, the maintenance engineer may interact with client device 210 to create a network group to be used to test the campaigns. Further, the maintenance engineer may indicate an order in which the campaigns are to be tested on network groups. As shown by reference number 575, assume that the maintenance engineer has created three network groups, shown as "Test Network 1," "PROD1," and "PROD2." The maintenance engineer may interact with the user interface to add networks to the network groups. For example, the maintenance engineer may interact with an "Available IPs" button to cause client device 210 to display a list of all available networks, as shown by reference number 580. The maintenance engineer may interact with a displayed network (e.g., a network identifier) to add the network to one or more of the network groups. Additionally, or alternatively, the maintenance engineer may interact with an "Automatic Group Creation" button to cause client device 210 and/or campaign testing device 230 to create the network groups.

Once the maintenance engineer has finished creating network groups, the maintenance engineer may interact with a "Save" button to cause client device 210 to provide information that identifies the network groups (e.g., and the networks included in each network group) to campaign testing device 230, as shown by reference number 585. In this way, the maintenance engineer can customize testing of the campaigns to reduce network disruptions.

As indicated above, FIGS. 5A-5I are provided merely as an example. Other examples are possible and may differ from what was described with regard to FIGS. 5A-5I.

Figure 6:
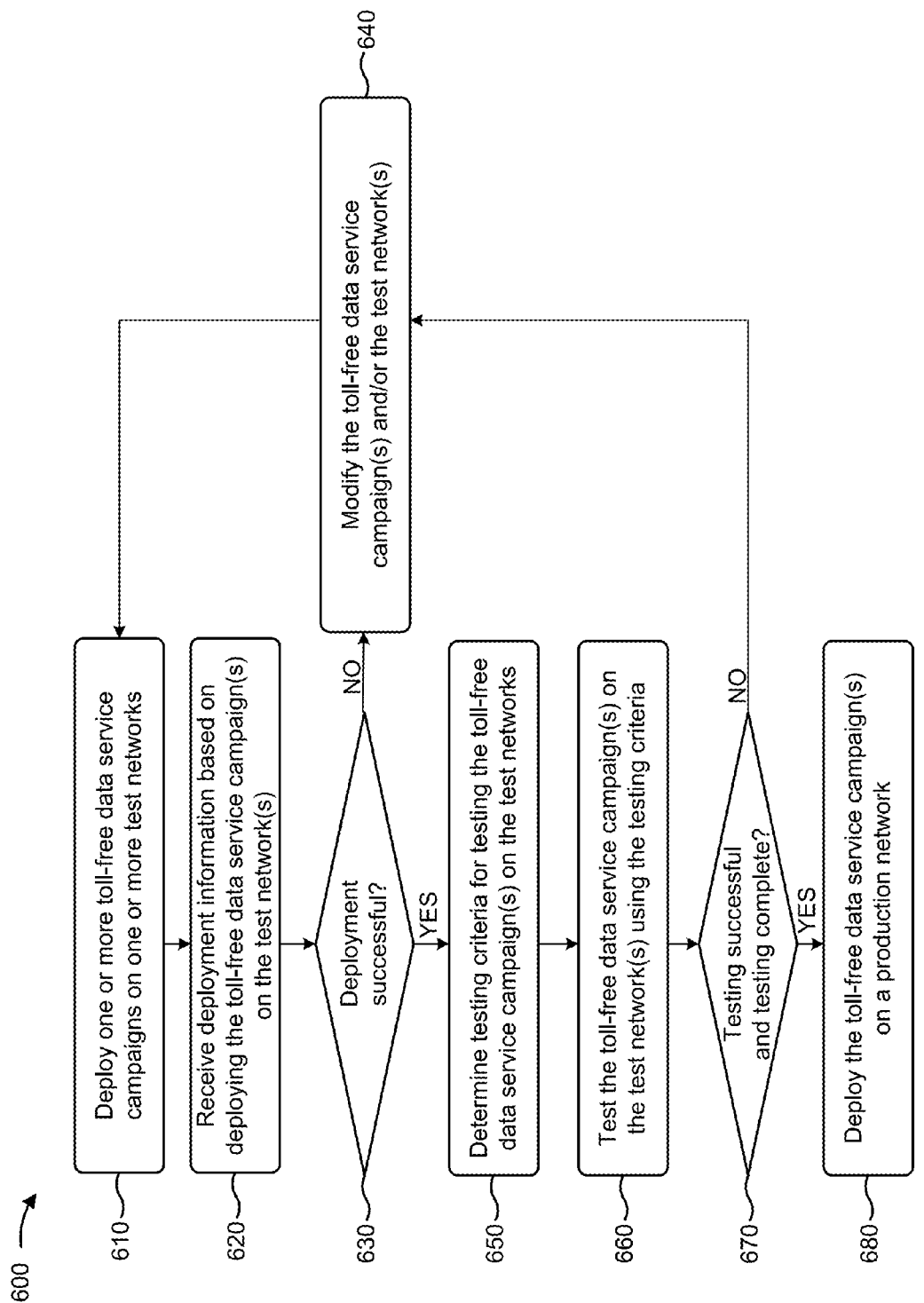
FIG. 6 is a flow chart of an example process for testing a toll-free data service campaign.

FIG. 6 is a flow chart of an example process 600 for testing a toll-free data service campaign. In some implementations, one or more process blocks of FIG. 6 may be performed by campaign testing device 230. In some implementations, one or more process blocks of FIG. 6 may be performed by another device or a group of devices separate from or including campaign testing device 230, such as client device 210, campaign input device 220, campaign enforcement device 260, and/or test mobile device 270.

As shown in FIG. 6, process 600 may include deploying one or more toll-free data service campaigns on one or more test networks (block 610). For example, campaign testing device 230 may deploy a set of campaigns, identified as described in connection with FIG. 4, to a set of test networks 240 (and/or production networks 250), identified as described in connection with FIG. 4. Campaign testing device 230 may deploy a campaign by providing campaign rules to a set of campaign enforcement devices 260 that handle network traffic for test network(s) 240. The campaign rules may instruct campaign enforcement device 260 how to handle network traffic associated with the campaign (e.g., how to identify traffic associated with the campaign, how to determine whether to charge a user or a content provider for data usage associated with the network traffic, etc.). Additionally, or alternatively, campaign testing device 230 may provide other configuration information (e.g., campaign information, information that identifies a campaign, etc.) to campaign enforcement device 260 to deploy a campaign on test network 240.

As further shown in FIG. 6, process 600 may include receiving deployment information based on deploying the toll-free data service campaign(s) on the test network(s) (block 620), and determining whether the deployment was successful (block 630). For example, campaign testing device 230 may receive deployment information, and may use the deployment information to determine whether deployment to test network 240 was successful. In some implementations, campaign testing device 230 may receive the deployment information from campaign enforcement device 260.

The deployment information may indicate, for example, whether the deployment (e.g., configuration information) was successfully installed on campaign enforcement device 260, whether the deployment was successfully executed by campaign enforcement device 260, or the like. Based on this information, campaign testing device 230 may determine whether the deployment was successful.

As further shown in FIG. 6, if the deployment was not successful (block 630—NO), then process 600 may include modifying the toll-free data service campaign(s) and/or the test network(s) (block 640), and returning to block 610. For example, if campaign testing device 230 determines that deployment was not successful, then campaign testing device 230 may modify the set of campaigns to be tested and/or the set of test networks 240 on which the set of campaigns are to be tested. In some implementations, campaign testing device 230 may remove campaigns that could not be deployed (e.g., that failed deployment) from the set of campaigns to be tested.

Additionally, or alternatively, campaign testing device 230 may remove test networks 240, on which the campaigns could not be deployed, from a test network group to be used to test the campaigns. Campaign testing device 230 may provide, to client device 210, information that identifies the failed campaigns and/or the failed test networks 240. Campaign testing device 230 may generate updated configuration information for the modified set of campaigns and test networks 240, and may deploy the modified set of campaigns on the modified test networks 240 based on the updated configuration information.

Additionally, or alternatively, campaign testing device 230 may provide, to client device 210, information that identifies campaigns that could not be deployed and/or test networks 240 on which deployment failed. An administrator may interact with client device 210 to modify the campaigns to be deployed (e.g., to modify campaign information and/or campaign rules, to debug compiled campaign information, to correct errors associated with a campaign, etc.), to remove a failed campaign from the set of campaigns to be tested, to modify a test network group (e.g., to remove a particular test network 240), or the like. Client device 210 may provide information associated with the modified campaigns and/or modified test networks 240 (e.g., a different set of campaigns and/or modified information associated with the campaigns, a different set of test networks 240 and/or modified information associated with test networks 240, etc.) to campaign testing device 230. Campaign testing device 230 may generate updated configuration information for the modified set of campaigns and test networks 240, and may deploy the modified set of campaigns on the modified test networks 240 based on the updated configuration information.

As further shown in FIG. 6, if the deployment was successful (block 630—YES), then process 600 may include determining testing criteria for testing the toll-free data service campaign(s) on the test networks (block 650). For example, if campaign testing device 230 determines that deployment was successful, then campaign testing device 230 may determine testing criteria for testing the toll-free data service campaigns on test network 240 (and/or production network 250). The testing criteria may identify a type of test to be applied when testing the campaigns, may identify a type of test that must be passed before a campaign can be deployed, or the like.

In some implementations, campaign testing device 230 may determine the testing criteria based on testing information received from client device 210. For example, an administrator may interact with client device 210 to provide input that identifies the testing criteria, and client device 210 may provide this information to campaign testing device 230. Additionally, or alternatively, campaign testing device 230 may store testing criteria (e.g., default testing criteria) to be applied to the campaigns during testing.

Additionally, or alternatively, campaign testing device 230 may determine the testing criteria based on campaign information and/or campaign rules associated with the campaigns. For example, campaign testing device 230 may test a campaign at a particular time during which the campaign will be active (e.g., a particular time of day), in a particular geographic region in which the campaign is to be deployed, or the like.

As further shown in FIG. 6, process 600 may include testing the toll-free data service campaign(s) on the test network(s) using the testing criteria (block 660). For example, campaign testing device 230 may test a campaign, on test network 240, using a test type identified by the testing criteria. In some implementations, campaign testing device 230 may perform automated testing. For example, campaign testing device 230 may test a campaign by providing instructions to campaign enforcement device 260 and/or mobile device 270 to test the campaign. Additionally, or alternatively, an administrator may perform manual testing, and may input a result of the manual testing (e.g., to campaign testing device 230 via client device 210). For example, an administrator may perform an action to initiate the test, may verify a test result, and may provide information that identifies the test result as input to client device 210. Client device 210 may provide the test result to campaign testing device 230.

As an example, a test type may include a test to confirm that a content provider is charged for data usage when a user accesses a service via an access point (e.g., a URL) that is associated with a toll-free data service. For this test type, campaign testing device 230 may conduct a test by providing instructions, to mobile device 270, to access a service, associated with toll-free data service campaign, using a URL that provides toll-free access to the service (e.g., a URL identified in campaign information). Campaign testing device 230 may verify that the content provider (e.g., and not the user) was charged for data usage associated with accessing the service. For example, campaign testing device 230 may request and/or receive information from campaign enforcement device 260 that indicates whether campaign enforcement device 260 permitted toll-free access to the service, may request and/or receive information (e.g., from an accounting server) that indicates whether the service provider was charged for the data usage, or the like.

As another example, a test type may include a test to confirm that a user is charged for data usage when the user accesses a service via an access point that is not associated with a toll-free data service. For this test type, campaign testing device 230 may conduct a test by providing instructions, to mobile device 270, to access a service, associated with toll-free data service campaign, using a URL that does not provide toll-free access to the service (e.g., a URL that is not identified in campaign information). Campaign testing device 230 may verify that the user (e.g., and not the content provider) was charged for data usage associated with accessing the service. For example, campaign testing device 230 may request and/or receive information from campaign enforcement device 260 that indicates whether campaign enforcement device 260 permitted toll-free access to the service, may request and/or receive information (e.g., from an accounting server) that indicates whether the user was charged for the data usage, or the like.

As another example, a test type may include a test of a campaign in a particular geographic region. For this test, campaign testing device 230 may conduct a test by providing instructions, to mobile device 270 located in the particular geographic region, to access a service (e.g., via a toll-free access point and/or a non-toll-free access point). In some implementations, campaign testing device 230 may perform the test in a geographic region in which the campaign is to be ultimately deployed (e.g., based on a geographic region identified in campaign information). Additionally, or alternatively, campaign testing device 230 may test the campaign in a different geographic region before testing and/or deploying the campaign in the geographic region in which the campaign is to be ultimately deployed. Campaign testing device 230 may verify the test by requesting and/or receiving information from other network devices (e.g., campaign enforcement device 260, mobile device 270, an accounting server, etc.), as described above.

As another example, a test type may include a test of a campaign during a particular time period. For this test, campaign testing device 230 may conduct a test by providing instructions, to mobile device 270, to access the service (e.g., via a toll-free access point and/or a non-toll-free access point) during the particular time period. In some implementations, campaign testing device 230 may perform the test during a time period during which the campaign is to be active (e.g., based on a time period identified in campaign information). For example, a content provider may specify a particular time of day, day of the week, month of the year, etc., during which the campaign is to be active. Additionally, or alternatively, campaign testing device 230 may test the campaign during a different time period before testing and/or deploying the campaign during the time period during which the campaign is to be active.

As another example, a test type may include a performance test. For example, campaign testing device 230 may determine performance criteria (e.g., memory usage, processor usage, etc.) associated with mobile device 270 at different time frames associated with accessing a toll-free data service (e.g., before, during, and/or after accessing a toll-free data service associated with a campaign). Campaign testing device 230 may compare the performance criteria during the different time frames. For example, campaign testing device 230 may determine whether a performance value measured while accessing the toll-free data service is within a threshold of a performance value measured before and/or after accessing the toll-free data service. Additionally, or alternatively, campaign testing device 230 may compare performance associated with a particular mobile device 270 to performance associated with another mobile device 270 and/or a group of mobile devices 270 including or excluding the particular mobile device 270 (e.g., an average performance measurement).

As another example, campaign enforcement device 230 may test whether mobile device 270 maintains communication with a network throughout testing (e.g., before, during, and/or after accessing the toll-free data service), whether data stored by mobile device 270 remains intact throughout testing, whether other applications on mobile device 270 continue to execute as intended throughout testing, whether mobile device 270 can place or receive emergency calls throughout testing, or the like. As another example, a test type may include a random test that randomly combines two or more of the above-identified test types.

As further shown in FIG. 6, process 600 may include determining whether testing was successful and whether testing is complete (block 670). For example, campaign testing device 230 may determine whether all tests, specified by the testing criteria, were successfully completed. Additionally, or alternatively, campaign testing device 230 may determine whether a campaign was tested on each test network 240 (e.g., or test network group) on which the campaign was to be tested (e.g., in a specified order). In some implementations, campaign testing device 230 may receive a test result and/or testing information (e.g., from mobile device 270, from campaign enforcement device 260, from client device 210, input by an administrator, etc.), and may determine whether testing was successful based on the test result and/or the testing information.

As further shown in FIG. 6, if the testing was not successful, or the testing is not complete (block 670—NO), then process 600 may include modifying the toll-free data service campaign(s) and/or the test network(s) (block 640), and returning to block 610. For example, if campaign testing device 230 determines that testing was not successful, then campaign testing device 230 may modify the set of campaigns to be tested and/or the set of test networks 240 on which the set of campaigns are to be tested, as described above in connection with block 630 and/or block 640.

Additionally, or alternatively, campaign testing device 230 may determine that testing is complete for a particular test network 240 and/or a particular test network group. If there are additional test networks 240 and/or test network groups to be tested, then campaign testing device may deploy and test the campaign(s) on the next test network 240 and/or test network group.

As further shown in FIG. 6, if the testing was successful, and the testing is complete (block 670—YES), then process 600 may include deploying the toll-free data service campaign(s) on a production network (block 680). For example, if campaign testing device 230 determines that testing was successful for every test network 240, then campaign testing device 230 may deploy the set of campaigns on production network 250. Campaign testing device 230 may deploy a campaign by providing campaign rules to a set of campaign enforcement devices 260 that handle network traffic for production network 250. Deploying a campaign on production network 250 may permit customers of a service provider, associated with production network 250, to access a toll-free data service associated with the campaign.

By testing toll-free data service campaigns in this manner, an administrator may reduce errors associated with full deployment of the toll-free data service campaign. Furthermore, the administrator may reduce disruptions to users that access services via a production network, which may include users that access toll-free data services and users that do not access toll-free data services. Also, campaign testing device 230 and/or client device 210 may require the administrator to follow a particular workflow (e.g., as shown in FIGS. 4 and 6) to ensure that deployment occurs step-by-step and to reduce deployment errors. In some implementations, the administrator may log out of the testing environment during a particular workflow step, and may log back in to return to the same workflow step.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of testing a toll-free data service campaign. For the purpose of FIGS. 7A-7D, assume that the operations described herein in connection with FIGS. 5A-5I have been performed.

Figure 7A:
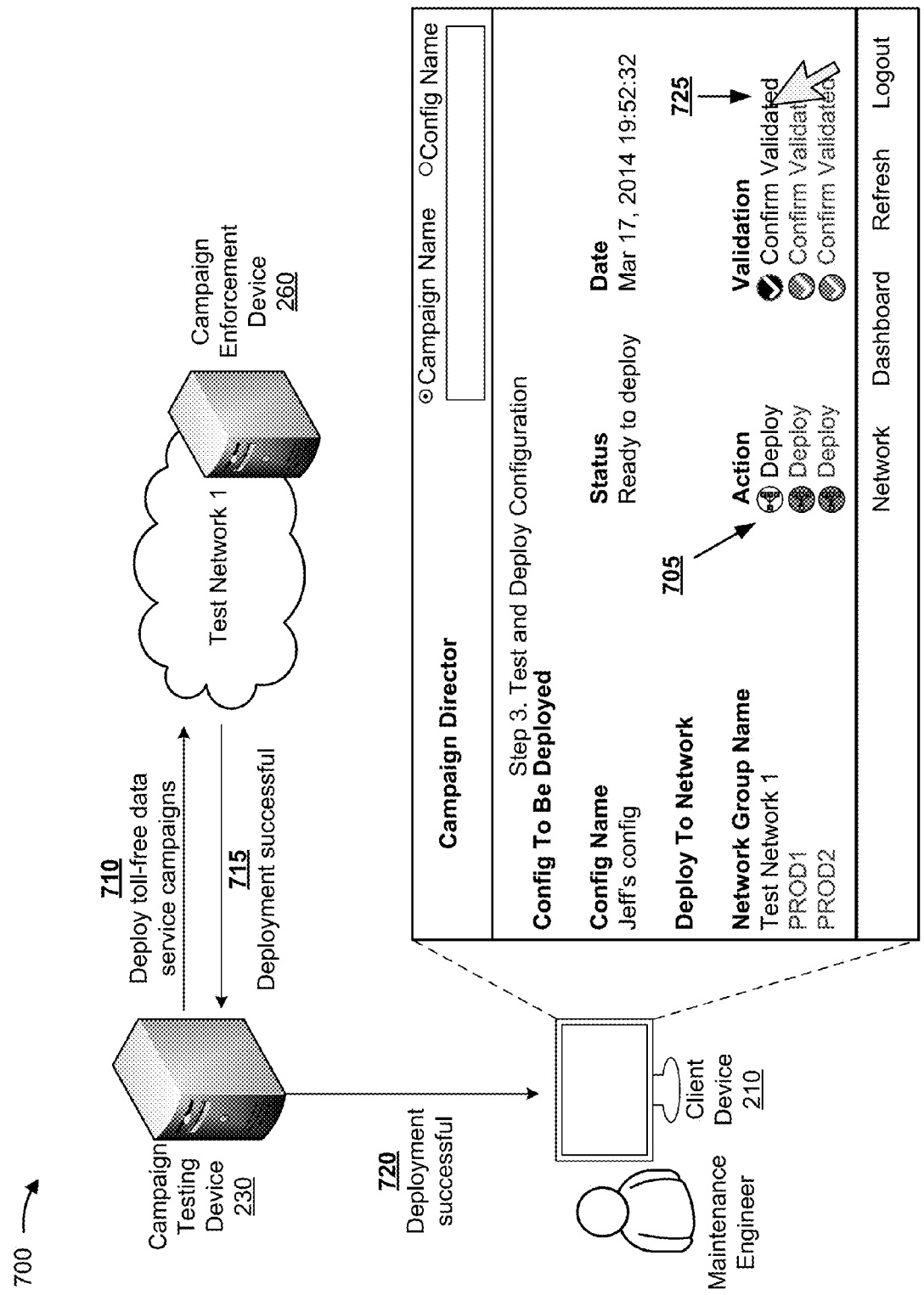
FIGS. 7A-7D are diagrams of an example implementation relating to the example process shown in FIG. 6.

As shown in FIG. 7A, client device 210 may provide a user interface that displays configuration information associated with the campaigns to be deployed. For example, the user interface may display a name, status, and date/time information associated with a configuration (e.g., "Jeff's config"). Furthermore, the user interface may display names of the network groups to be used to test the campaigns (e.g., "Test Network 1," "PROD1," and "PROD2"). The user interface may provide input mechanisms to permit a maintenance engineer to deploy campaigns on a test network group and/or to validate campaigns on a test network group using test criteria. In some implementations, deployment and/or testing of a particular test network group may be disabled until another test network group has been successfully deployed and/or tested (e.g., based on a specified order).

For the purpose of FIG. 7A, assume that the maintenance engineer has interacted with a "Deploy" button associated with Test Network 1, as shown by reference number 705. Based on this interaction, and as shown by reference number 710, campaign testing device 230 deploys the toll-free data service campaigns, described in connection with FIGS. 5A-5I, to test network 240 identified as "Test Network 1." Assume that a maintenance engineer has created Test Network 1 by adding individual networks to create a test network group, as described in connection with FIGS. 5A-5I. Assume that the campaigns were successfully deployed by campaign enforcement device 260 associated with Test Network 1, and that campaign enforcement device 250 provides an indication, to campaign testing device 230, that deployment was successful, as shown by reference number 715. As shown by reference number 720, campaign testing device 230 provides this indication to client device 210.

Based on receiving an indication that deployment was successful, client device 210 permits the maintenance engineer to interact with a "Confirm Validated" button to test the campaigns in the configuration. As shown by reference number 725, assume that the maintenance engineer interacts with the "Confirm Validated" button.

Figure 7B:
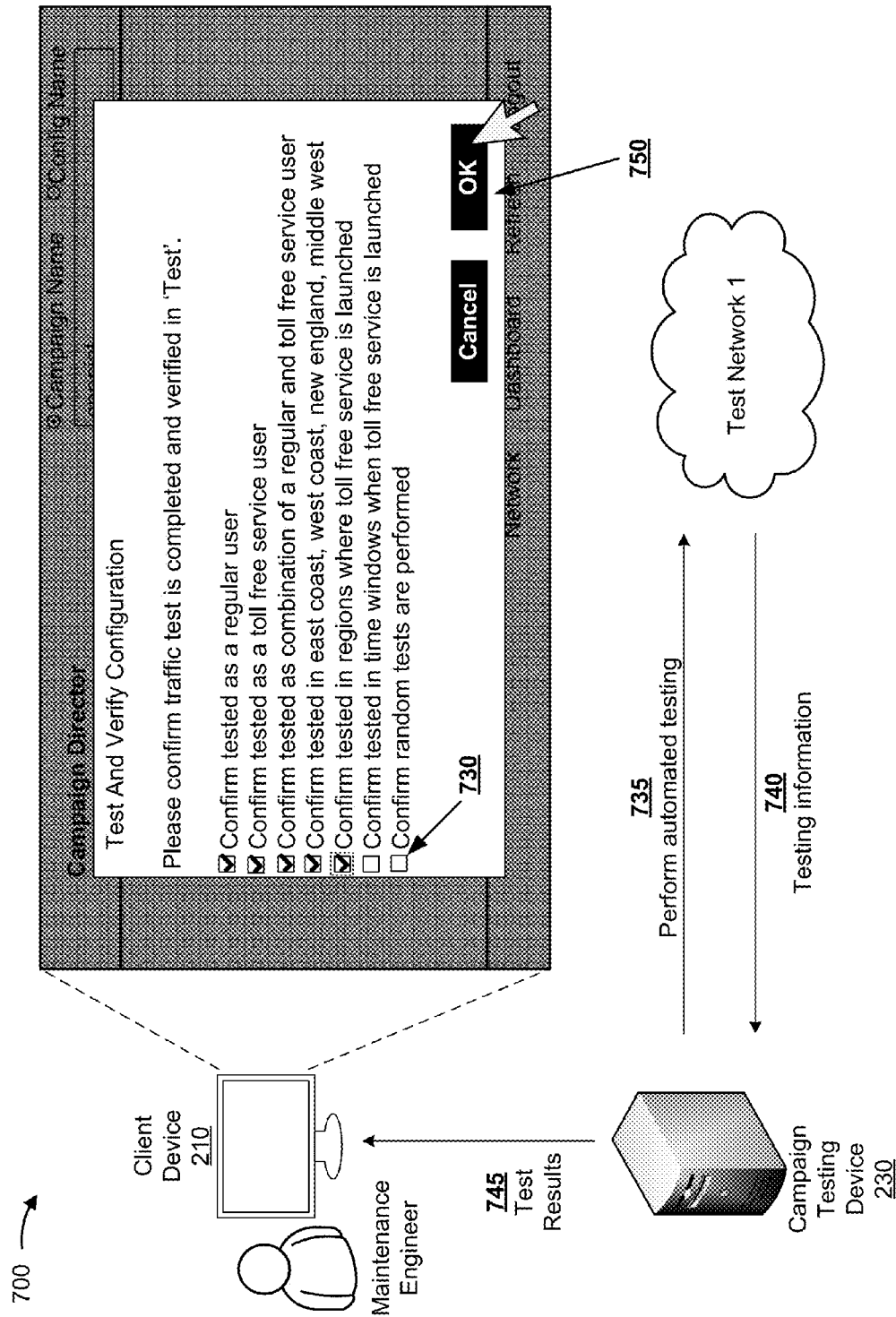

As shown in FIG. 7B, based on the user interaction, assume that client device 210 provides a user interface that permits the maintenance engineer and/or campaign testing device 230 to validate deployment of the campaign by performing tests. In some cases, the maintenance engineer may manually perform a test, and may interact with an input mechanism to indicate whether the test was successful, as shown by reference number 730.

Additionally, or alternatively, campaign testing device 230 may automatically perform a test, and may provide an indication of whether a test was successful. In this case, client device 210 may not permit the maintenance engineer to interact with an input mechanism to indicate whether the test was successfully completed. For automatic testing, campaign testing device 230 may receive an indication (e.g., from client device 210) to initiate testing. Based on the indication, campaign testing device 230 may perform automated tests, as shown by reference number 735, and may receive testing information based on the automated tests, as shown by reference number 740. Campaign testing device 230 may interpret the testing information to generate test results, and may provide the test results to client device 210, as shown by reference number 745. Once all tests have been successfully completed, the maintenance engineer may interact with an "OK" button, as shown by reference number 750. In some implementations, the "OK" button may be disabled until all tests have been successfully completed.

Figure 7C:
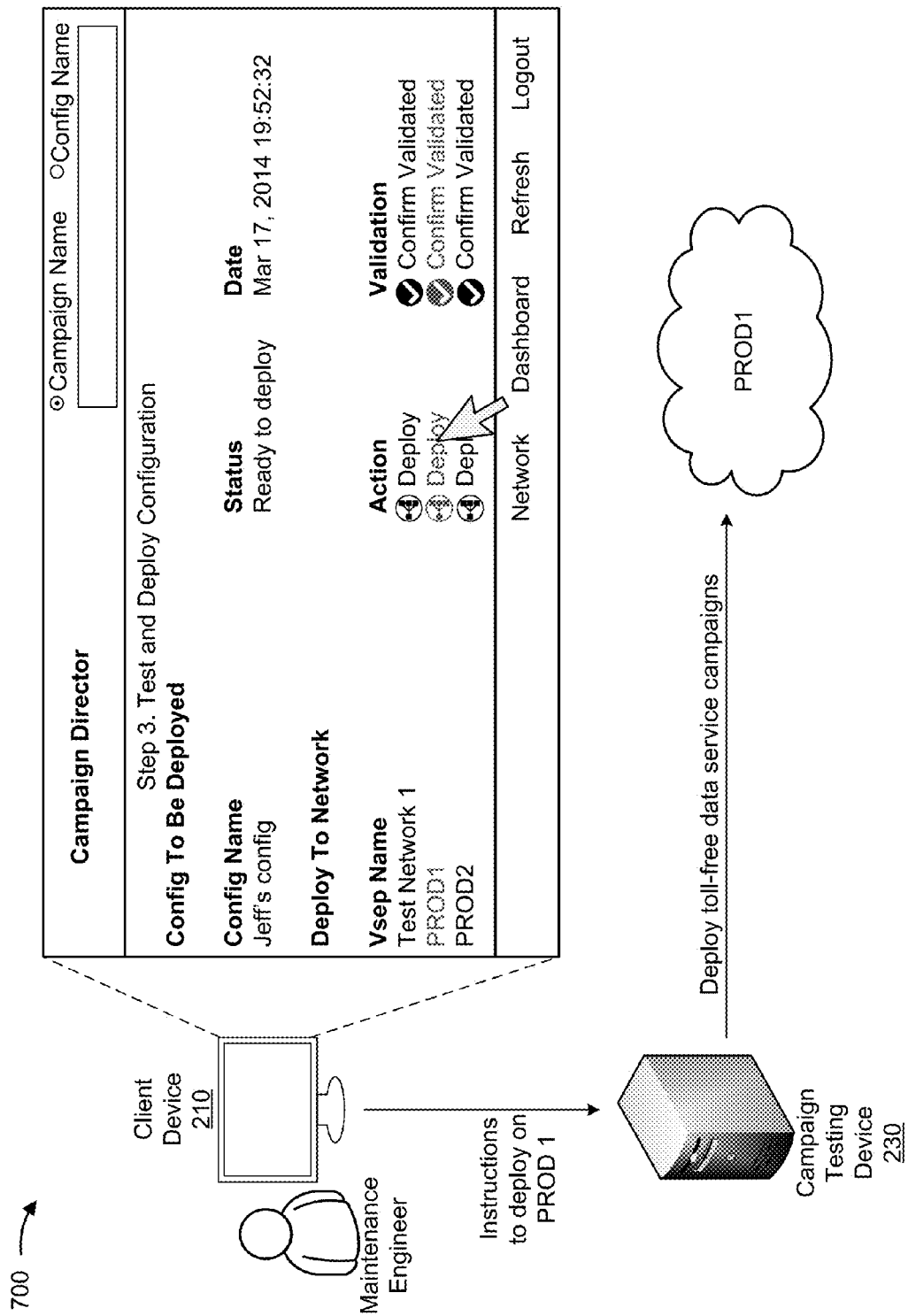

As shown in FIG. 7C, interaction with the "OK" button may indicate that testing was successful for Test Network 1, and may permit the maintenance engineer to deploy the campaigns on the "PROD1" test network group. Deployment and testing may proceed on PROD1 as described above with respect to Test Network 1. Once deployment and testing on PROD1 is successfully completed, the maintenance engineer may initiate deployment and testing on PROD2. Additionally, or alternatively, campaign testing device 230 may automatically initiate deployment and testing on PROD2 (e.g., without input from the maintenance engineer) once deployment and testing on PROD1 is successful. In this way, the maintenance engineer and campaign testing device 230 may iteratively test toll-free data service campaigns on multiple networks.

Figure 7D:
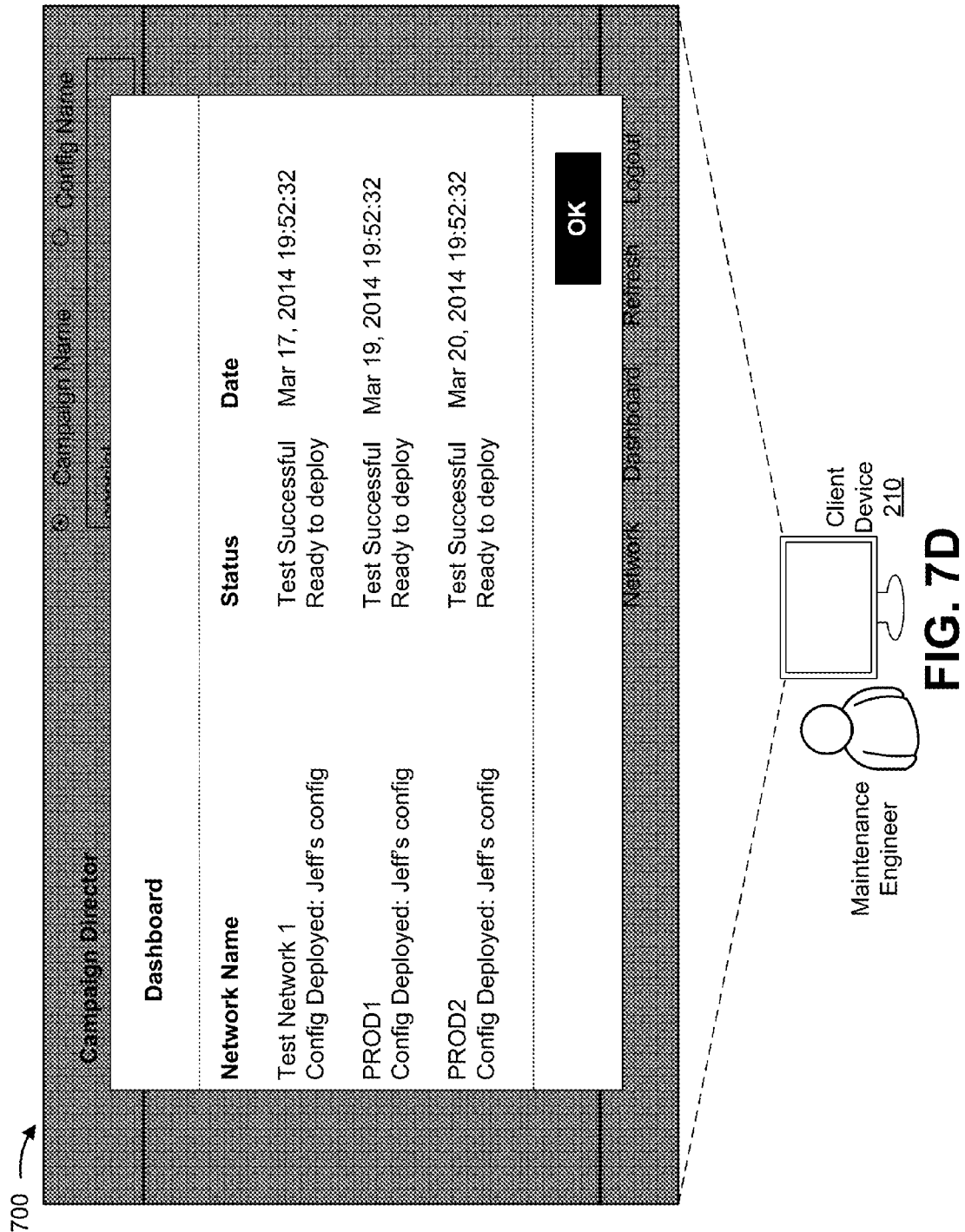

As shown in FIG. 7D, the maintenance engineer may interact with client device 210 to cause a deployment summary to be provided for display. The deployment summary may display information that identifies test network groups, configurations tested on test network groups, a status of the configuration (e.g., ready to deploy, deployment failed, testing failed, etc.), a date and/or time associated with a deployment or a test, or the like. In this way, the maintenance engineer may better manage deployment of toll-free data service campaigns.

As indicated above, FIGS. 7A-7D are provided merely as an example. Other examples are possible and may differ from what was described with regard to FIGS. 7A-7D.

Implementations described herein describe architectures and operations for efficient, effective, and structured testing and deployment of toll-free data service campaigns in a manner that reduces negative impacts to networks via which the toll-free data service campaigns are deployed.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memory devices; and
   one or more processors, connected to the one or more memory devices, to:
   receive information that identifies a toll-free data service campaign to be tested;
   receive information that identifies one or more networks to be used to test the toll-free data service campaign;
   deploy the toll-free data service campaign on a first network of the one or more networks,
      a campaign rule, associated with the toll-free data service campaign, that identifies a condition for charging a content provider, associated with the toll-free data service campaign, for data used by a mobile device in association with the toll-free data service campaign being deployed based on deploying the toll-free data service campaign on the first network;
   determine testing criteria for testing the toll-free data service campaign on the first network,
      the testing criteria including:
         a test type including:
            at least one of automated testing or manual testing to confirm that the content provider is charged for data usage based on a service being accessed via an access point associated with the toll-free data service campaign,
         a particular geographic region in which to test the toll-free data service campaign, and
         a particular time period during which to test the toll-free data service campaign;
   test the toll-free data service campaign on the first network using the testing criteria;
   determine a test result based on testing the toll-free data service campaign on the first network using the testing criteria;
   provide, for display, information that identifies the test result; and
   deploy the toll-free data service campaign on a second network of the one or more networks based on the test result indicating a successful test,
      the second network being different from the first network.

2. The device of claim 1, where the one or more processors are further to:
   receive information that identifies a plurality of toll-free data service campaigns to be tested,
      the plurality of toll-free data service campaigns including the toll-free data service campaign; and
   where the one or more processors, when deploying the toll-free data service campaign, are to:
      deploy the plurality of toll-free data service campaigns on the first network.

3. The device of claim 1, where the one or more processors, when receiving the information that identifies the one or more networks, are to:
   receive information that identifies a plurality of networks to be included in a network group to be used to test the toll-free data service campaign; and
   form the network group based on receiving the information that identifies the plurality of networks; and
   where the one or more processors, when testing the toll-free data service campaign on the first network, are to:
      test the toll-free data service campaign on the plurality of networks included in the network group,
         the first network being included in the plurality of networks.

4. The device of claim 1, where the one or more processors, when receiving the information that identifies the one or more networks, are to:
   receive information that identifies the second network to be used to test the toll-free data service campaign; and
   receive an indication that the toll-free data service campaign is to be tested on the first network before being tested on the second network.

5. The device of claim 1, where the one or more processors are further to:
   receive information that identifies a plurality of toll-free data service campaigns to be tested,
      the plurality of toll-free data service campaigns including the toll-free data service campaign;
   receive campaign information associated with the plurality of toll-free data service campaigns,
      the campaign information indicating a manner in which the plurality of toll-free data service campaigns are to be deployed;

generate configuration information, for deploying the plurality of toll-free data service campaigns, based on the campaign information; and
verify the configuration information; and
where the one or more processors, when deploying the toll-free data service campaign, are to:
deploy the toll-free data service campaign based on verifying the configuration information.
6. The device of claim 1, where the one or more processors are further to:
receive information that identifies a plurality of toll-free data service campaigns to be tested,
the plurality of toll-free data service campaigns including the toll-free data service campaign;
receive campaign information associated with the plurality of toll-free data service campaigns,
the campaign information indicating a manner in which the plurality of toll-free data service campaigns are to be deployed;
generate configuration information, for deploying the plurality of toll-free data service campaigns, based on the campaign information;
determine that the configuration information could not be verified; and
modify the plurality of toll-free data service campaigns, based on determining that the configuration information could not be verified, to form modified toll-free data service campaigns; and
where the one or more processors, when deploying the toll-free data service campaign, are to:
deploy the modified toll-free data service campaigns.
7. The device of claim 1, where the access point is a Uniform Resource Locator (URL).
8. A non-transitory computer-readable medium storing instructions, the instructions comprising:
one or more instructions that, when executed by one or more processors, cause the one or more processors to:
receive information associated with a toll-free data service campaign to be tested;
receive information that identifies a first network to be used to test the toll-free data service campaign;
deploy the toll-free data service campaign on the first network;
provide, to a campaign enforcement device associated with the first network and based on deploying the toll-free data service campaign, information that identifies a condition for charging a service provider, associated with the toll-free data service campaign, for data used by a mobile device when accessing a service associated with the toll-free data service campaign;
identify a test type to be used to test the toll-free data service campaign on the first network,
the test type including:
at least one of automated testing or manual testing to confirm that the service provider is charged for data usage based on a service being accessed via an access point associated with the toll-free data service campaign;
receive testing information based on the test type,
the testing information indicating a test result associated with testing the toll-free data service campaign on the first network;
provide, for display, the testing information; and
deploy the toll-free data service campaign on a second network based on the test result indicating the testing of the toll-free data service campaign on the first network was successful,
the second network being different from the first network.
9. The non-transitory computer-readable medium of claim 8, where the one or more instructions, when executed by the one or more processors, further cause the one or more processors to:
receive campaign information that identifies the access point,
the access point being used to access the service and charge the service provider for data usage associated with accessing the service; and
where the one or more instructions, that cause the one or more processors to receive the testing information, cause the one or more processors to:
receive an indication of whether the service provider was properly charged for data usage when the mobile device accesses the service via the access point.
10. The non-transitory computer-readable medium of claim 8, where the test type is a first test type;
where the one or more instructions, when executed by the one or more processors, further cause the one or more processors to:
receive campaign information that identifies the access point,
the access point being used to access the service and charge the service provider for data usage associated with accessing the service; and
identify a second test type to be used to test the toll-free data service campaign on the first network,
the second test type including
a test to confirm whether a user, associated with the mobile device, is charged for data usage when the mobile device accesses the service via another access point that is different from the access point; and
where the one or more instructions, that cause the one or more processors to receive the testing information, cause the one or more processors to:
receive an indication of whether the user was properly charged for data usage when the mobile device accesses the service via the other access point.
11. The non-transitory computer-readable medium of claim 8, where the test type is a first test type;
where the one or more instructions, when executed by the one or more processors, further cause the one or more processors to:
receive campaign information that identifies a geographic region associated with the toll-free data service campaign; and
identify a second test type to be used to test the toll-free data service campaign on the first network,
the second test type including
a test to confirm whether the toll-free data service campaign was successfully deployed in the geographic region; and
where the one or more instructions, that cause the one or more processors to receive the testing information, cause the one or more processors to:
receive an indication of whether the toll-free data service campaign was successfully deployed in the geographic region.
12. The non-transitory computer-readable medium of claim 8, where the test type is a first test type;

where the one or more instructions, when executed by the one or more processors, further cause the one or more processors to:
receive campaign information that identifies a time period associated with the toll-free data service campaign;
identify a second test type to be used to test the toll-free data service campaign on the first network,
the second test type including a test to confirm whether the toll-free data service campaign was successfully deployed during the time period; and
where the one or more instructions, that cause the one or more processors to receive the testing information, cause the one or more processors to:
receive an indication of whether the toll-free data service campaign was successfully deployed during the time period.

13. The non-transitory computer-readable medium of claim 8, where the test type is a first test type;
where the one or more instructions, when executed by the one or more processors, further cause the one or more processors to:
identify a second test type to be used to test the toll-free data service campaign on the first network,
the second test type including
a performance test to test performance of the mobile device before, during, or after deployment of the toll-free data service campaign; and
where the one or more instructions, that cause the one or more processors to receive the testing information, cause the one or more processors to:
receive an indication of whether the mobile device passed the performance test.

14. The non-transitory computer-readable medium of claim 8, where the one or more instructions, when executed by the one or more processors, further cause the one or more processors to:
provide instructions, for testing the toll-free data service campaign based on the test type, to the mobile device or the campaign enforcement device; and
where the one or more instructions, that cause the one or more processors to receive the testing information, cause the one or more processors to:
receive the testing information from the mobile device or the campaign enforcement device based on providing the instructions to the mobile device or the campaign enforcement device.

15. A method, comprising:
receiving, by a device, campaign information associated with a toll-free data service campaign to be tested;
receiving, by the device, information that identifies a plurality of test networks to be used to test the toll-free data service campaign;
deploying, by the device, the toll-free data service campaign on a first test network of the plurality of test networks,
deploying the toll-free data service campaign including providing, to a campaign enforcement device associated with the first test network, a condition for charging a service provider, associated with the toll-free data service campaign, for data used by a mobile device when accessing a toll-free data service associated with the toll-free data service campaign;
disabling, by the device, deployment of the toll-free data service campaign on a second test network, of the plurality of test networks, until determining that the toll-free data service campaign was successfully tested on the first test network;
identifying, by the device, a test to be used to test the toll-free data service campaign on the first test network, the test including:
at least one of automated testing or manual testing confirming that the service provider is charged for data usage based on a service being accessed via an access point associated with the toll-free data service campaign;
receiving, by the device, testing information based on the identified test,
the testing information indicating a test result associated with testing the toll-free data service campaign on the first test network;
providing, by the device and for display, the testing information; and
deploying, by the device, the toll-free data service campaign on the second test network of the plurality of test networks based on the test result indicating a successful test.

16. The method of claim 15, further comprising:
providing a first instruction, for testing the toll-free data service campaign based on the identified test, to the mobile device; and
providing a second instruction, for testing the toll-free data service campaign based on the identified test, to the campaign enforcement device; and
where receiving the testing information comprises:
receiving the testing information from the mobile device or the campaign enforcement device.

17. The method of claim 15, where receiving the testing information comprises:
receiving the testing information from a client device based on input provided to the client device.

18. The method of claim 15, further comprising:
receiving information that identifies a plurality of toll-free data service campaigns to be tested,
the plurality of toll-free data service campaigns including the toll-free data service campaign; and
where deploying the toll-free data service campaign comprises:
deploying the plurality of toll-free data service campaigns on the first test network.

19. The method of claim 15, where providing the testing information comprises:
providing, for display on a user interface, names of network groups to be used to test a plurality of toll-free data service campaigns,
the network groups including the first test network and the second test network,
the plurality of toll-free data service campaigns including the toll-free data service campaign, and
the user interface providing input mechanisms for selecting one or more of the plurality of toll-free data service campaigns to be deployed on one or more of the network groups.

20. The method of claim 15, further comprising:
testing whether the service provider is charged for data usage based on the service being accessed via a Uniform Resource Locator (URL) associated with the toll-free data service campaign.

* * * * *